US012679973B2

(12) United States Patent
Wang et al.

(10) Patent No.: US 12,679,973 B2
(45) Date of Patent: Jul. 14, 2026

(54) PREPARATION METHOD OF BRANCHED POLYAMIDE (PA) COPOLYMER WITH ULTRA-HIGH TOUGHNESS, PA COPOLYMER PREPARED USING THE METHOD, AND USE OF THE PA COPOLYMER

(71) Applicant: ANHUI AGRICULTURAL UNIVERSITY, Hefei (CN)

(72) Inventors: Zhongkai Wang, Hefei (CN); Wei Liu, Hefei (CN); Chuqing Ma, Hefei (CN); Cheng Liu, Hefei (CN); Zhong Wang, Hefei (CN); Yaqiong Zhang, Hefei (CN)

(73) Assignee: ANHUI AGRICULTURAL UNIVERSITY, Hefei (CN)

( * ) Notice: Subject to any disclaimer, the term of this patent is extended or adjusted under 35 U.S.C. 154(b) by 642 days.

(21) Appl. No.: 18/116,865

(22) Filed: Mar. 3, 2023

(65) Prior Publication Data

US 2023/0203308 A1 Jun. 29, 2023

Related U.S. Application Data

(63) Continuation of application No. PCT/CN2021/114043, filed on Aug. 23, 2021.

(51) Int. Cl.
*C08L 77/06* (2006.01)

(52) U.S. Cl.
CPC ......... *C08L 77/06* (2013.01); *C08L 2205/025* (2013.01)

(58) Field of Classification Search
CPC ......... D01F 6/90; C08G 69/265; C08G 69/28; C08L 2205/02; C08L 2205/025; C08L 67/04; C08L 77/02; C08L 77/06
See application file for complete search history.

(56) References Cited

U.S. PATENT DOCUMENTS

| | | | |
|---|---|---|---|
| 3,304,289 A | 2/1967 | Ballentine et al. | |
| 5,068,311 A | 11/1991 | Horn et al. | |
| 2015/0148518 A1* | 5/2015 | Kukalyekar ............ | C08L 77/06 528/340 |

FOREIGN PATENT DOCUMENTS

| | | |
|---|---|---|
| CN | 1497005 A | 5/2004 |
| CN | 102093708 A | 6/2011 |
| CN | 103649173 A | 3/2014 |
| CN | 105492537 A | 4/2016 |
| CN | 106555250 A | 4/2017 |
| CN | 108383998 A | 8/2018 |
| CN | 108752580 A | 11/2018 |
| CN | 110003629 A | 7/2019 |
| CN | 110156984 A | 8/2019 |
| CN | 110878139 A | 3/2020 |
| CN | 112920403 A | 6/2021 |
| CN | 112920436 A | 6/2021 |
| CN | 113024804 A | 6/2021 |
| GB | 1446454 A | 8/1976 |
| WO | 2017164129 A1 | 9/2017 |
| WO | 2021063835 A1 | 4/2021 |

OTHER PUBLICATIONS

Quan-Fu An, et al., Microstructural characterization and evaluation of pervaporation performance of thin-film composite membranes fabricated through interfacial polymerization on hydrolyzed polyacrylonitrile substrate, Journal of Membrane Science, 2019, pp. 31-39, vol. 583.
ISO 179-1, Plastics—Determination of Charpy impact properties—Part 1: Non-instrumented impact test, International Standard, 2010, pp. 1-22.
ISO 179-2, Plastics—Determination of Charpy impact properties—Part 2: Instrumented impact test, International Standard, 2020, pp. 1-23.
ISO 527-1, Plastics—Determination of tensile properties—Part 1: General principles, International Standard, 2019, pp. 1-26.
ISO 62, Plastics—Determination of water absorption, International Standard, 2008, pp. 1-15.

* cited by examiner

*Primary Examiner* — Ana L. Woodward
(74) *Attorney, Agent, or Firm* — Bayramoglu Law Offices LLC

(57) ABSTRACT

A preparation method of a branched polyamide copolymer with ultra-high toughness is disclosed. The preparation method includes: (1) dissolving a linear dibasic acid in a solvent A to obtain a linear dibasic acid solution, dissolving a diamine B in a solvent B to obtain a diamine solution B, and dissolving a diamine C in a solvent C to obtain a diamine solution C; (2) adding the diamine solution B to the linear dibasic acid solution to obtain an amide salt solution B; and adding the diamine solution C to the linear dibasic acid solution, and collecting a precipitate to obtain an amide salt C; and (3) mixing the amide salt solution B with the amide salt C, adding a catalyst, and conducting melt polycondensation. The prepared branched copolymer has excellent mechanical performance and is suitable for melt blending toughening, melt extrusion spinning, blow-extruded films, hot melt adhesives, and other fields.

19 Claims, 11 Drawing Sheets

PREPARATION METHOD OF BRANCHED POLYAMIDE (PA) COPOLYMER WITH ULTRA-HIGH TOUGHNESS, PA COPOLYMER PREPARED USING THE METHOD, AND USE OF THE PA COPOLYMER

CROSS REFERENCE TO THE RELATED APPLICATIONS

The application is a Continuation Application of International Application No. PCT/CN2021/114043, filed on Aug. 23, 2021, the entire contents of which are incorporated herein by reference.

TECHNICAL FIELD

The present disclosure relates to the technical field of polyamides (PAs) and, in particular, to a preparation method of a branched PA copolymer with ultra-high toughness, a PA copolymer prepared using the method, and use of the PA copolymer.

BACKGROUND

Polyamide, commonly known as nylon and abbreviated as PA, is a generic term for thermoplastic resins in which repeating amide groups —[NHCO]— are included in a molecular main chain, including aliphatic PA, semi-aromatic PA, and aromatic PA. PAs are generally prepared by any of the following three methods: amino acid polycondensation, lactam ring-opening polymerization (ROP), or dibasic acid-diamine polycondensation. PAs are one of the five major engineering plastics with a huge output and have become an indispensable structural material in various industries. PAs mainly have the following performance characteristics: (1) excellent mechanical performance, high mechanical strength, and prominent toughness; (2) excellent self-lubrication, prominent friction resistance, and a small coefficient of friction (COF); (3) excellent thermal resistance, high thermal deformation temperature, and capability for long-term use at a high temperature; (4) excellent electrical insulation performance and excellent electrical performance; (5) excellent weather resistance; and (6) high water absorption due to the existence of amide bonds.

PAs are widely used in various fields, such as automobiles, electricity, electronics, and energy in daily life. Nevertheless, PA6 and PA66 with general mechanical performance and high water absorption are currently the most popular ones on the market. Long-chain PAs, such as special PAs PA11, PA12, PAST, and PA10T, are used in some fields including aerospace and military. However, these PAs do not possess versatility and have difficulty in achieving copolymerization, and thus it is difficult to prepare a PA copolymer with adjustable performance by a low-cost simple method. Chinese Patent CN1497005A discloses a PA and a resin composition, where dimethylpentanediamine and azelaic acid are used as some raw materials to synthesize the PA. In the Chinese Patent, the ferroelectric, solubility, and insulation properties of the PA are investigated, but the mechanical performance of the PA is not studied.

Long-chain PAs generally refer to nylon with 10 or more carbon atoms in a monomeric carbon chain. In addition to the general properties of ordinary nylon, such as wear resistance, compression resistance, lubricity, solvent resistance, and workability, long carbon chain nylon also has unique properties, such as low water absorption, prominent dimensional stability, high toughness and softness, excellent electrical performance, and abrasion resistance. Due to these unique properties, such nylon has always received special attention home and abroad. The ordinary nylon 6 and nylon 66 also have the following shortcomings, such as poor low-temperature impact resistance, poor dimensional stability after water absorption, poor dry-washing and water-washing resistance, sharply-declined tensile and flexural strength, and greatly-deteriorated electrical performance, which greatly limits the application scope of the nylon. The advent of long carbon chain nylon can make up for these shortcomings of nylon 6 and nylon 66. Chinese Patent CN106555250 A discloses a long carbon chain PA fiber and a preparation method thereof, where a long carbon chain PA resin is used as a production raw material, and the production raw material of the long carbon chain PA resin includes 1,5-pentanediamine and a dibasic acid. However, the fiber prepared has an elongation at break of no more than 30%.

Long-chain PAs with excellent performance are also a class of toughening agents that can be widely used, for instance, to enhance the performance of another material through simple physical modification, such as blending, strengthening, toughening, and compatibilization. For example, long-chain nylon can be used to toughen short-chain nylon, polylactic acid (PLA), and other materials with poor mechanical performance.

The consumption of short-chain nylon PA6 and PA66 makes up about 90% of the total consumption of nylon on the market. However, when used as an engineering plastic, PA6 exhibits sensitivity to notch and brittleness, high water absorption, and poor toughness in dry and low-temperature environments, which greatly limits the use of PA6 in some industries. With people's further understanding of polymer materials, application fields of polymer materials have gradually expanded, and the requirements for polymer materials have become increasingly stringent in many industries. In addition, polymer materials should also keep pace with the times and meet the increasing requirements in various fields. For example, Chinese Patent CN102093708A discloses a β-nucleated thermoplastic vulcanizate (TPV)-toughened nylon 6 blend and a preparation method thereof, where the impact toughness of nylon 6 is improved by blending nylon 6 with a β-nucleated TPV. However, it is not disclosed that the water absorption of nylon 6 can be reduced.

PLA is a polyester polymer obtained through polymerization with lactic acid as the main raw material, which can be used as a safe and environmentally-friendly biodegradable plastic. PLA is a green fully organism-derived material with excellent performance, which is made with starch extracted from a renewable plant resource as a raw material. When used, PLA can be completely degraded by microorganisms in nature to finally produce carbon dioxide and water, which does not pollute the environment. Therefore, PLA is recognized as an environmentally-friendly material.

Pure PLA has prominent mechanical and physical performance, but it exhibits poor toughness, and thus, is recognized as a brittle material and has a low thermal deformation temperature of only 55° C. Therefore, it is necessary to modify PLA. Because PLA shows prominent compatibility with various polymers, PLA is mainly modified by physically blending PLA with a material with prominent toughness such as polyester, such that PLA can be used in various situations, for example, packaging materials, degradable lunch boxes, and various plastic products. PLA has prominent biocompatibility and degradability, and thus, is extensively used in the medical field. For example, PLA can be used to produce a disposable infusion set, a non-removable surgical suture, or the like, and low-molecular-weight PLA can be used as a drug sustained-release packaging agent. The toughening modification of PLA has aroused great scientific interest, and researchers have conducted a lot of related research.

In summary, pure PLA materials have excellent comprehensive performance, but in some circumstances, pure PLA cannot meet the requirements for use and must be modified. For example, Chinese Patent CN110003629A discloses a high-toughness bio-based PLA composition and a preparation method thereof, where PLA and a bio-based PA polymer are mixed to prepare a PLA composition. However, the composition in the prior art has low tensile stress and strain, which limits the application range of composites.

SUMMARY

The first technical problem to be solved by the present disclosure is to provide a preparation method for an ultra-high toughness PA copolymer, where the mechanical performance of a PA copolymer can be adjusted by adjusting the content of an amide salt in an esterification reaction. The present disclosure provides a preparation method of a branched PA copolymer with ultra-high toughness and a branched PA copolymer with ultra-high toughness prepared using the method.

The present disclosure solves the above technical problem through the following technical solutions:

A preparation method of a branched PA copolymer with ultra-high toughness is provided, including the following steps:

(1) dissolving a linear dibasic acid in a solvent A to obtain a linear dibasic acid solution, dissolving a diamine B in a solvent B to obtain a diamine solution B, and dissolving a diamine C in a solvent C to obtain a diamine solution C, where the diamine B includes a linear diamine or a mixture of a linear diamine and a diamine with an unreactive side group and the diamine C includes a diamine with a reactive side group;

(2) adding the diamine solution B dropwise to the linear dibasic acid solution, and mixing to obtain an amide salt solution B; and adding the diamine solution C dropwise to the linear dibasic acid solution, mixing, and collecting a precipitate to obtain an amide salt C; and (3) adding the amide salt solution B and the amide salt C to a reactor, adding a catalyst, and conducting melt polycondensation to obtain the branched PA copolymer with ultra-high toughness.

Beneficial effects: In the present disclosure, a network structure of the PA copolymer can be adjusted by adjusting the amount of the diamine with the reactive side group to obtain branched PA copolymers with different properties. The prepared PA copolymers have prominent mechanical performance, a tensile fracture toughness as high as 295.7 $MJ/M^3$, low water absorption, a melting point of 120° C. to 170° C., a degradation temperature of higher than 350° C., and a wide processing window temperature, and are suitable for melt blending toughening, melt extrusion spinning, blow-extruded films, hot melt adhesives, and other fields.

In addition, the amide salt prepared from the diamine with the unreactive side group is in a liquid state and thus can be thoroughly mixed with an amide salt in a solid state to obtain a homogeneous amide salt solution. The liquid amide salt has a high heat transfer rate and uniform heat transfer and is not prone to uneven reaction degree of materials caused by local overheating that often occurs during melt polymerization.

Preferably, in step (2), the pH of the amide salt solution B is adjusted to 6.5 to 7.5, and then the amide salt solution is heated for evaporating solvent and concentration to obtain an amide salt solution with a solute mass fraction of 60% to 80%.

Beneficial effect: The pH is adjusted to keep the solution neutral, thereby preventing a polymer from being terminated due to an excessive amount of dibasic acid or diamine.

Preferably, the pH is 6.8 to 7.4.

Preferably, in step (2), the pH of the amide salt solution C is adjusted to 6.5 to 7.5, and then the precipitate is collected and dried to obtain the amide salt C.

Beneficial effect: The pH is adjusted to keep the solution neutral, thereby preventing a polymer from being terminated due to an excessive amount of dibasic acid or diamine.

Preferably, the pH is 6.8 to 7.4.

Preferably, in step (2), the linear dibasic acid and the diamine B are mixed in a molar ratio of 0.98:1 to 1.02:1 during the preparation of the amide salt solution B, and the linear dibasic acid and the diamine C are mixed in a molar ratio of 0.98:1 to 1.02:1 during the preparation of the amide salt C.

Preferably, the mass of the diamine is 35% to 40% of the total mass of the diamine and the linear dibasic acid, and the mass of the dibasic acid is 60% to 65% of the total mass of the diamine and the linear dibasic acid.

Preferably, in step (3), the mass fraction of the amide salt solution B is 89% to 97%, the mass fraction of the amide salt C is 2% to 10%, and the mass fraction of the catalyst is 1% to 2%.

Preferably, the melt polycondensation in step (3) includes the following steps: heating to 100° C. to 120° C. and holding the temperature for 1 h to 2 h, heating to 150° C. to 170° C. and holding the temperature for 2 h to 3 h to allow prepolymerization, purging gas to remove water produced by the reaction to obtain a prepolymer with a specified viscosity, heating to 200° C.-280° C. and vacuuming for 4 h-8 h to remove water produced by the reaction to enable an expected viscosity, stopping the heating, and discharging a product through pressurization under a nitrogen atmosphere to obtain the branched PA copolymer with ultra-high toughness.

Preferably, the linear dibasic acid is selected from the group consisting of malonic acid, succinic acid, glutaric acid, adipic acid, pimelic acid, suberic acid, azelaic acid, sebacic acid, undecanedioic acid, dodecanedioic acid, tridecanedioic acid, and tetradecanedioic acid.

Preferably, the diamine with the unreactive side group is selected from the group consisting of 2-methylpentanediamine, 1,2-propanediamine, 1,3-diaminopentane, 2,2-dimethyl-1,3-propanediamine 2,4-diaminophenol, and 4-fluoro-1,3-diaminobenzene.

Preferably, the linear diamine is selected from the group consisting of ethylenediamine (EDA), 1,3-propanediamine, 1,4-diaminobutane, 1,5-pentanediamine, 1,6-hexanediamine, 2,2,4-trimethyl-1,6-hexanediamine, 2,4,4-trimethyl-1,6-hexanediamine, cis-1,4-cyclohexanediamine, trans-1,4-cyclohexanediamine, 1,8-octanediamine, 1,9-nonanediamine, 1,10-decanediamine, dodecanediamine, tridecanediamine, tetradecanediamine, cyclohexanediamine, methylcyclohexanediamine, p-phenylenediamine, m-phenylenediamine, and dimethyldiamine.

Preferably, the diamine with the reactive side group for the esterification reaction is selected from the group consisting of 1,3-diamino-dipropanol and 2,4-diaminophenol.

Preferably, the catalyst is selected from the group consisting of sodium phosphite, sodium hypophosphite (SHP), and zinc acetate.

Preferably, the solvent A, the solvent B, and the solvent C each include at least one selected from the group consisting of water, methanol, and ethanol.

The present disclosure also provides a branched PA copolymer with ultra-high toughness prepared by the above preparation method.

Beneficial effects: The prepared PA copolymers have prominent mechanical performance, a tensile toughness as high as 295.7 MJ/M$^3$, low water absorption, a melting point of 120° C. to 170° C., a degradation temperature of higher than 350° C., and a wide processing window temperature, and are suitable for melt blending toughening, melt extrusion spinning, blow-extruded films, hot melt adhesives, and other fields.

A second technical problem to be solved by the present disclosure is to provide a bio-based nylon composite that can improve the toughness of nylon 6 and reduce its water absorption, and a preparation method thereof.

The present disclosure solves the above technical problem through the following technical solutions:

The present disclosure provides a bio-based nylon composite prepared mainly from the following raw materials in parts by weight: 1 to 100 parts of nylon 6, 50 to 100 parts of the PA copolymer, and 0 to 5 parts of an antioxidant.

Beneficial effect: The PA copolymer in the present disclosure can be used as a toughening agent for nylon 6 to construct a binary super-toughness blending system with nylon 6. During the reactive blending process, both PAs each have a specified content of amido bonds, tight hydrogen bonding can be formed among amido bonds, and the terminal amino and carboxyl can react. The highly-regular crystalline part of nylon 6 is destroyed, where PA molecular chains are linked through staggered hydrogen bonds to achieve a toughening effect. Moreover, due to the addition of a long-chain PA, the density of amido bonds per unit volume among molecules decreases, which leads to a decline in water absorption of the PA composite.

The PA copolymer is uniformly dispersed in nylon 6 at a micro-scale and a nano-scale, which can play a role of energy absorption to improve the mechanical performance of the composition. Nylon 6 can undergo an interfacial reaction with the PA copolymer to reduce the interfacial tension between components and improve interfacial strength. The prominent interfacial interaction and dispersion effect are key factors for improving the toughness of nylon 6.

When the PA copolymer is used as a toughening agent, the prepared bio-based composite exhibits a significant toughening effect compared with nylon 6, but the strength is not significantly reduced. Compared with a petroleum-based material, the bio-based material has greater policy support and a more promising application prospect, and the physical properties such as toughness, elongation at break, and water absorption of the nylon 6 composite are greatly improved with little impact on the rigidity and strength of the material, which increases the utilization space of the composite.

A bio-based monomer derived from castor oil is used in the PA copolymer of the present disclosure, such as a linear dibasic acid, and China is the second largest producer of castor oil, which is conducive to driving the economic development of upstream industries.

The composite of the present disclosure is a bio-based composite (when a bio-based content in a composite is 30% or higher, the composite can be classified as a bio-based composite), which conforms to relevant national policy standards and has promising application prospects.

Preferably, the antioxidant is pentaerythritol tetrakis[β-(3,5-di-tert-butyl-4-hydroxyphenyl)propanoate].

Preferably, the bio-based nylon composite is prepared mainly from the following raw materials in parts by weight: 50 parts of nylon 6, 50 parts of the PA copolymer, and 0.5 part of an antioxidant.

Preferably, the bio-based nylon composite is prepared mainly from the following raw materials in parts by weight: 40 parts of nylon 6, 60 parts of the PA copolymer, and 0.5 part of an antioxidant.

Preferably, the bio-based nylon composite is prepared mainly from the following raw materials in parts by weight: 30 parts of nylon 6, 70 parts of the PA copolymer, and 0.5 part of an antioxidant.

Preferably, the bio-based nylon composite is prepared mainly from the following raw materials in parts by weight: 20 parts of nylon 6, 80 parts of the PA copolymer, and 0.5 part of an antioxidant.

A preparation method for the bio-based nylon composite is provided, including the following steps:

(1) pretreating each of the nylon 6 and the PA copolymer in a vacuum oven at 40° C. to 120° C. for 4 h to 12 h; and (2) adding the pretreated materials obtained in step (1) to an internal mixer and blending for 3 min to 20 min at a temperature of 180° C. to 260° C. and a rotational speed of 40 r/min to 300 r/min to obtain the bio-based nylon composite.

Beneficial effects: The nylon 6 and the PA copolymer in the present disclosure can be easily melted and blended with a prominent blending effect. The preparation process involves a low equipment investment and simple operations and has a high economic value and great market potential.

A third technical problem to be solved by the present disclosure is to provide a PA fiber prepared from the PA copolymer and a preparation method thereof in view of the low elongation at break of PA fibers in the prior art.

The present disclosure solves the above technical problem through the following technical solutions:

The present disclosure provides a PA fiber prepared mainly from the following raw materials in parts by weight through melt spinning: 1 to 1,000 parts of the PA copolymer and 0 to 5 parts of an antioxidant.

Beneficial effects: The PA copolymer in the present disclosure is subjected to melt spinning with the antioxidant to obtain the PA fiber in which a bio-based PA melt is subjected to melt spinning to obtain a specified oriented structure. Compared to film materials, PA fibers have a higher application value in home decoration and clothes. The PA fiber has a fracture strain of about 800%, fracture stress as high as 80 MPa, and low water absorption. The antioxidant can reduce the oxidative yellowing of the PA copolymer during melt spinning. The existing nylon 6 has a strength merely of 60 MPa to 70 MPa and a fracture strain of less than 150%.

Compared with a fiber material in the prior art, the PA fiber in the present disclosure has a longer carbon chain, a lower amido bond density, and lower water absorption.

Preferably, the antioxidant is n-octadecyl β-(3,5-di-tert-butyl-4-hydroxyphenyl)propionate.

Preferably, the PA copolymer is used in 1,000 parts by weight and the antioxidant is used in 5 parts by weight.

Preferably, the PA copolymer is used in 1 part by weight and the antioxidant is used in 0 part by weight.

Preferably, the PA copolymer is used in 500 parts by weight and the antioxidant is used in 1 part by weight.

Preferably, the PA copolymer is used in 500 parts by weight and the antioxidant is used in 3 parts by weight.

A preparation method for the PA fiber is provided, including the following steps:

(1) pretreating the PA copolymer at 40° C. to 100° C. for 4 h to 12 h; and (2) mixing the pretreated PA copolymer obtained in step (1) with the antioxidant, adding the resulting mixture to a melt spinning machine, preheating at 50° C. to 120° C., conducting melt compression at 180° C. to 250° C., extruding, and rolling out at a speed of 1 m/min to 3,000 m/min to obtain the PA fiber.

The PA copolymer and the antioxidant are subjected to melt spinning to obtain the high-strength PA fiber. During the melt spinning, the PA copolymer is preheated in the first stage at a preheating temperature lower than the melting point of the PA copolymer, such that the material is softened in this stage in preparation for melting in the subsequent stage.

In the second stage, the materials are subjected to high-temperature melting and compression under a physical action of a screw. To exhaust residual air in the materials to obtain fibers without defects such as bubbles, the materials undergo a prominent melt blending effect in the second stage. A melted flowing material is filtered and shunted and finally passes through a spinneret of a melt spinning machine, and the material is subjected to specified orientation and arrangement at the spinneret. A thin melt stream ejected from the spinneret is cooled in air or cooled by cold air, and a drawing speed can be adjusted, such that the material changes from a molten state to a solid state and rolled out to form a fiber.

Beneficial effects: The PA fiber in the present disclosure can be simply processed and treated. The preparation process involves low equipment investment and simple operations, and the obtained fiber has excellent mechanical performance, high economic value, and great market potential.

A bio-based PA melt is subjected to melt spinning to obtain a specified oriented structure. The PA fiber has a fracture strain of about 800% and fracture stress as high as 80 MPa. The antioxidant can reduce the oxidative yellowing of the PA copolymer during melt spinning.

Preferably, the PA fiber obtained after the compounding in step (2) is subjected to a drawing treatment with a drawing machine to obtain a treated fiber.

Beneficial effect: The drawing treatment can improve the orientation degree of molecular chains and the tensile strength of the fiber.

A fourth technical problem to be solved by the present disclosure is to provide a high-strength and high-toughness PLA composite and a preparation method thereof, such as to increase the tensile stress and strain of the composite while maintaining the strength of PLA.

The present disclosure provides a high-strength and high-toughness PLA composite prepared mainly from the following raw materials in parts by weight: 50 to 100 parts of PLA, 1 to 50 parts of the PA copolymer, and 0 to 1 part of an antioxidant.

In the present disclosure, the PA copolymer is used as a toughening agent for PLA to construct a binary super-toughness blending system without adding another solubilizing agent. The PA copolymer is uniformly dispersed in PLA at a micro-scale and a nano-scale, which can play the role of energy absorption to improve the mechanical performance and toughness of the composition with a relatively significant effect. The prominent compatibility between the PLA and the PA copolymer is key to strengthening and toughening.

Beneficial effects: When the PA copolymer is used as a toughening agent, the bio-based composite exhibits a significant toughening effect compared with PLA, but the strength is not significantly reduced. Compared with a petroleum-based material, the bio-based material has greater policy support and a more promising application prospect, and the physical properties such as toughness and elongation at break of the PLA composite are greatly improved with little impact on the rigidity and strength of the material, where an elongation at break is about 300% and toughness is about 80 $MJ/m^3$.

A bio-based monomer derived from castor oil is used in the bio-based PA elastomer of the present disclosure, such as a linear dibasic acid, and China is the second largest producer of castor oil, which is conducive to driving the economic development of upstream industries.

The composite of the present disclosure is a bio-based composite (which has a bio-based content of 30% or higher), which conforms to relevant national policy standards and has promising application prospects.

The bio-based material is defined as a material with a bio-based content of 30% or higher.

Preferably, the antioxidant is pentaerythritol tetrakis[β-(3,5-di-tert-butyl-4-hydroxyphenyl)propanoate].

Preferably, the high-strength and high-toughness PLA composite is prepared mainly from the following raw materials in parts by weight: 90 parts of PLA, 10 parts of the PA copolymer, and 0.5 part of an antioxidant.

Preferably, the high-strength and high-toughness PLA composite is prepared mainly from the following raw materials in parts by weight: 95 parts of PLA, 5 parts of the PA copolymer, and 0.5 part of an antioxidant.

Preferably, the high-strength and high-toughness PLA composite is prepared mainly from the following raw materials in parts by weight: 98 parts of PLA, 2 parts of the PA copolymer, and 0.5 part of an antioxidant.

Preferably, the high-strength and high-toughness PLA composite is prepared mainly from the following raw materials in parts by weight: 99 parts of PLA, 1 part of the PA copolymer, and 0.5 part of an antioxidant.

A preparation method for the high-strength and high-toughness PLA composite is provided, including the following steps:

(1) pretreating each of the PLA and the PA copolymer in a vacuum oven at 40° C. to 120° C. for 4 h to 12 h; and (2) adding the pretreated materials obtained in step (1) to an internal mixer, and blending for 3 min to 20 min at a temperature of 160° C. to 240° C. and a rotational speed of 40 r/min to 300 r/min to obtain the high-strength and high-toughness PLA composite.

Beneficial effects: The PLA and the PA copolymer in the present disclosure can be easily blended. The preparation process involves a low equipment investment and simple operations and has a high economic value and great market potential.

The bio-based composite exhibits a significant toughening effect compared with PLA, but the strength is not significantly reduced. Compared with a petroleum-based material, the bio-based material has greater policy support and a more promising application prospect, and the physical properties such as toughness and elongation at break of the PLA composite are greatly improved with little impact on the rigidity and strength of the material, where an elongation at break is about 300% and an optimal tensile toughness is 74.94 $MJ/m^3$.

The present disclosure has the following advantages: In the present disclosure, a network structure of the PA copolymer can be adjusted by adjusting an amount of the diamine with the reactive side group to obtain branched PA copolymers with different properties. The prepared PA copolymers have prominent mechanical performance, a tensile fracture toughness as high as 295.7 $MJ/M^3$, low water absorption, a melting point of 120° C. to 170° C., a degradation temperature of higher than 350° C., and a wide processing window temperature, and are suitable for melt blending toughening, melt extrusion spinning, blow-extruded films, hot melt adhesives, and other fields.

In addition, the amide salt prepared from the diamine with the unreactive side group is in a liquid state and thus can be thoroughly mixed with an amide salt in a solid state to obtain a homogeneous amide salt solution. The liquid amide salt has a high heat transfer rate and uniform heat transfer and is not prone to uneven reaction degree of materials caused by local overheating that often occurs during melt polymerization.

The PA copolymer in the present disclosure can be used as a toughening agent for nylon 6 to construct a binary super-toughness blending system with nylon 6. During the reactive blending process, both PAs each have a specified content of amido bonds, tight hydrogen bonding can be formed among amido bonds, and the terminal amino and carboxyl can react. The highly-regular crystalline part of nylon 6 is destroyed, where PA molecular chains are linked through staggered hydrogen bonds to achieve a toughening effect. Moreover, due to the addition of a long-chain PA, the density of amido bonds per unit volume among molecules decreases, which leads to a decline in water absorption of the PA composite.

The PA copolymer is uniformly dispersed in nylon 6 at a micro-scale and a nano-scale, which can play a role of energy absorption to improve the mechanical performance of the composition. Nylon 6 can undergo an interfacial reaction with the PA copolymer to reduce the interfacial tension between components and improve interfacial strength. The prominent interfacial interaction and dispersion effect are key factors for improving the toughness of nylon 6.

When the PA copolymer is used as a toughening agent, the prepared bio-based composite exhibits a significant toughening effect compared with nylon 6, but the strength is not significantly reduced. Compared with a petroleum-based material, the bio-based material has greater policy support and a more promising application prospect, and the physical properties such as toughness, elongation at break, and water absorption of the nylon 6 composite are greatly improved with little impact on the rigidity and strength of the material, which increases the utilization space of the composite.

A bio-based monomer derived from castor oil is used in the PA copolymer of the present disclosure, such as a linear dibasic acid, and China is the second largest producer of castor oil, which is conducive to driving the economic development of upstream industries.

The composite of the present disclosure is a bio-based composite (when a bio-based content in a composite is 30% or higher, the composite can be classified as a bio-based composite), which conforms to relevant national policy standards and has promising application prospects.

The PA copolymer in the present disclosure is subjected to melt spinning with the antioxidant to obtain the PA fiber in which a bio-based PA melt is subjected to melt spinning to obtain a specified oriented structure. Compared with film materials, PA fibers have a higher application value in home decoration and clothes. The PA fiber has a fracture strain of about 800%, fracture stress as high as 80 MPa, and low water absorption. The antioxidant can reduce the oxidative yellowing of the PA copolymer during melt spinning. The existing nylon 6 has a strength merely of 60 MPa to 70 MPa and a fracture strain of less than 150%.

Compared with a fiber material in the prior art, the PA fiber in the present disclosure has a longer carbon chain, a lower amido bond density, and lower water absorption.

The PA fiber in the present disclosure can be simply processed and treated. The preparation process involves a low equipment investment and simple operations, and the obtained fiber has excellent mechanical performance, a high economic value, and great market potential.

When the PA copolymer is used as a toughening agent, the bio-based composite exhibits a significant toughening effect compared with PLA, but the strength is not significantly reduced. Compared with a petroleum-based material, the bio-based material has greater policy support and a more promising application prospect, and the physical properties such as toughness and elongation at break of the PLA composite are greatly improved with little impact on the rigidity and strength of the material, where an elongation at break is about 300% and toughness is about 80 $MJ/m^3$.

A bio-based monomer derived from castor oil is used in the PA copolymer of the present disclosure, such as a linear dibasic acid, and China is the second largest producer of castor oil, which is conducive to driving the economic development of upstream industries.

The composite of the present disclosure is a bio-based composite (which has a bio-based content of 30% or higher), which conforms to relevant national policy standards and has promising application prospects.

The PLA and the PA copolymer in the present disclosure can be easily blended. The preparation process involves a low equipment investment and simple operations and has a high economic value and great market potential.

DETAILED DESCRIPTION OF THE EMBODIMENTS

Figure 1:
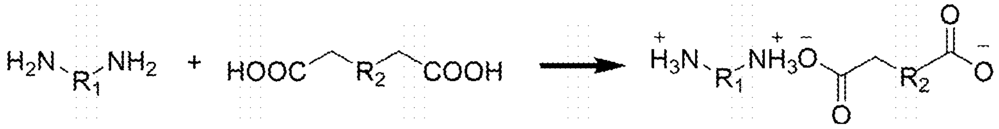
FIG. 1 shows a structural formula of an amide salt produced from a dibasic acid and a diamine in an example of the present disclosure.
Figure 2:
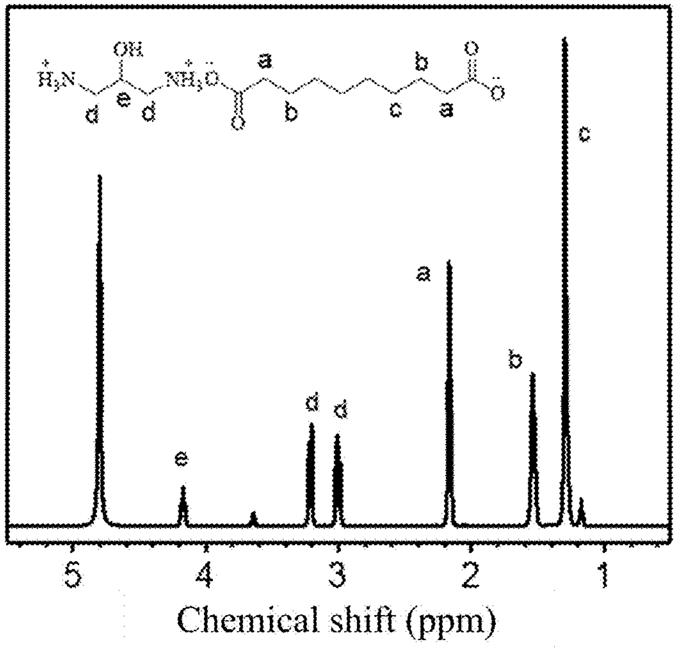
FIG. 2 shows a structural formula and the nuclear magnetic resonance hydrogen ($^1$H NMR) spectrum of an amide salt produced from 1,3-diamino-2-propanol and sebacic acid in an example of the present disclosure.
Figure 3:
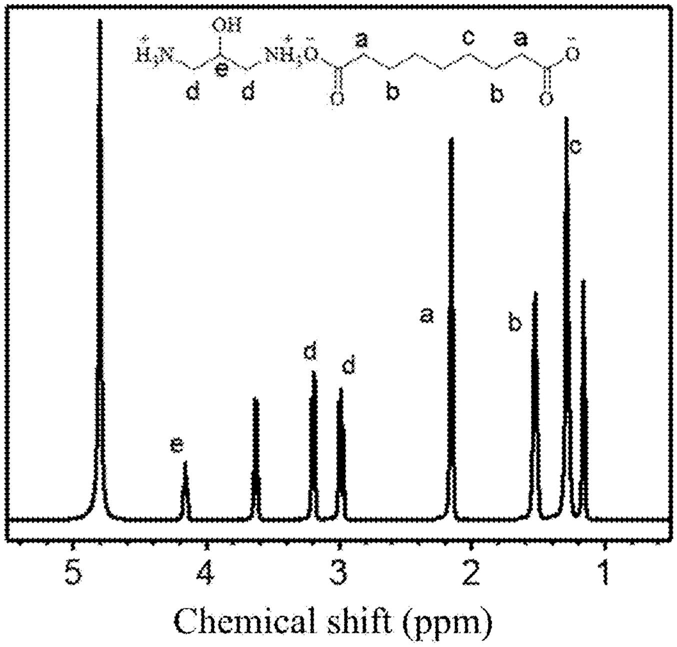
FIG. 3 shows a structural formula and the $^1$H NMR spectrum of an amide salt produced from 1,3-diamino-2-propanol and azelaic acid in an example of the present disclosure.
Figure 4:
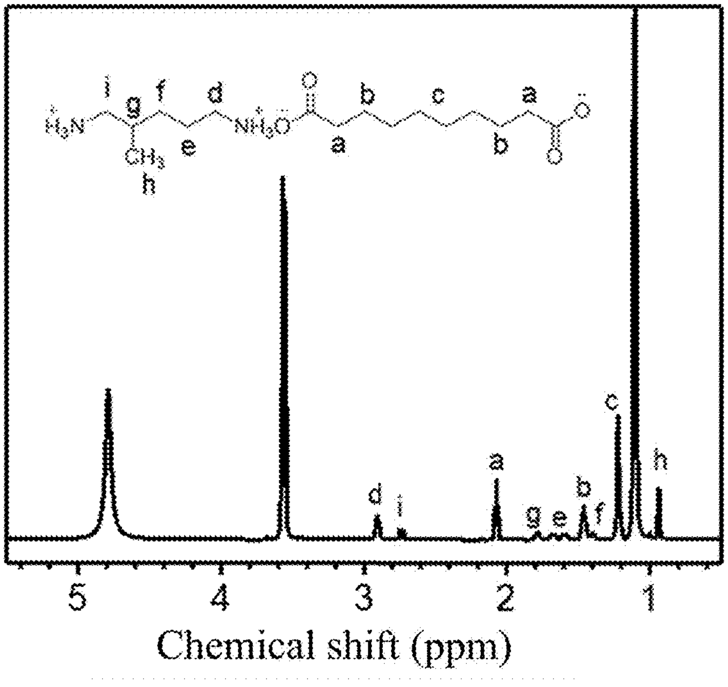
FIG. 4 shows a structural formula and the $^1$H NMR spectrum of an amide salt produced from dimethylpentanediamine and sebacic acid in an example of the present disclosure.
Figure 5:
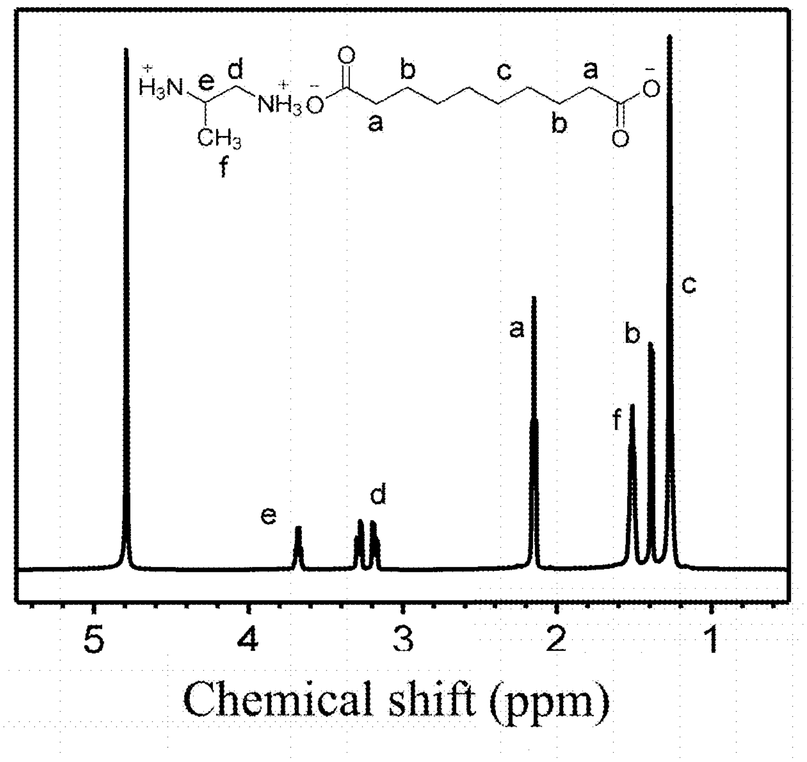
FIG. 5 shows a structural formula and the $^1$H NMR spectrum of an amide salt produced from 1,2-propanediamine and sebacic acid in an example of the present disclosure.

To make the objectives, technical solutions, and advantages of the examples of the present disclosure clearer, the technical solutions in the examples of the present disclosure will be clearly and completely described below with reference to the examples of the present disclosure. The described examples are some, rather than all, of the examples of the present disclosure. All other examples obtained by a person of ordinary skill in the art based on the examples of the present disclosure without creative efforts shall fall within the protection scope of the present disclosure.

The experimental materials, reagents, and the like used in the following examples are all commercially available unless otherwise specified.

If specific techniques or conditions are not indicated in an example, the process shall be conducted in accordance with the techniques or conditions described in the literature in the art or in accordance with a product specification.

Example 1

A preparation method of a branched PA copolymer with ultra-high toughness was provided, specifically including the following steps:

(1) 202 g of sebacic acid was added to 600 mL of ethanol, and the resulting mixture was heated to 60° C. for dissolution to obtain a dibasic acid solution. 116 g of dimethylpentanediamine was diluted with 200 mL of ethanol and then added dropwise to the dibasic acid solution, and the resulting mixed solution was mixed for about 10 h. The pH of the mixed solution was measured and adjusted to 6.5 to 7.5, and the mixed solution was heated for evaporating solvent and concentration to obtain an about 70% amide salt solution B in which the amide salt B was an unbranched amide salt.

(2) 4.2 g of sebacic acid was added to 15 mL of ethanol, and the resulting mixture was heated for dissolution to obtain a dibasic acid solution. 1.8 g of 1,3-diamino-2-propanol was diluted with 10 mL of ethanol and added dropwise to the dibasic acid solution, and the resulting mixed solution was mixed for about 10 h. The pH of the mixed solution was measured and adjusted to 6.5 to 7.5, and the resulting precipitate was collected by filtration and dried in a vacuum oven at 50° C. for 12 h to obtain an amide salt C, which was a branched amide salt.

(3) The concentrated unbranched amide salt solution B and the branched amide salt C were added to a high-temperature high-pressure reactor. 1% (based on total parts by weight) of a catalyst SHP was added, and the resulting mixture was first heated to 100° C. and kept at the temperature for 2 h to remove the solvent ethanol and water and then slowly heated to 150° C. and kept at the temperature for 2 h to allow prepolymerization. Gas was purged to remove water produced by the reaction to obtain a prepolymer with a specified viscosity, and the prepolymer was heated to 200° C. to 280° C. and subjected to a vacuum for about 6 h to remove water produced by the reaction. After the heating was stopped, the product was discharged through pressurization under a nitrogen atmosphere to obtain a finished PA copolymer product, which was named PAX10.

In the PA copolymer obtained in Example 1, the molar ratio of the unbranched amide salt to the branched amide salt was 98:2. The molar ratio was calculated as follows: the unbranched amide salt had a mass of 318 g and a relative molecular mass of 318 g/mol, and the branched amide salt had a mass of 6 g and a relative molecular mass of 292 g/mol, and thus the molar ratio of the two was calculated to be 98:2.

Example 2

A preparation method of a branched PA copolymer with ultra-high toughness was provided, specifically including the following steps:

(1) 202 g of sebacic acid was added to 600 mL of ethanol, and the resulting mixture was heated to 60° C. for dissolution to obtain a dibasic acid solution. 116 g of dimethylpentanediamine was diluted with 200 mL of ethanol and then added dropwise to the dibasic acid solution, and the resulting mixed solution was mixed for about 10 h. The pH of the mixed solution was measured and adjusted to 6.5 to 7.5, and the mixed solution was heated for evaporating solvent and concentration to obtain an about 70% amide salt solution B in which the amide salt B was an unbranched amide salt.

(2) 6.4 g of sebacic acid was added to 20 mL of ethanol, and the resulting mixture was heated for dissolution to obtain a dibasic acid solution. 2.9 g of 1,3-diamino-2-propanol was diluted with 20 mL of ethanol and added dropwise to the dibasic acid solution, and the resulting mixed solution was mixed for about 10 h. The pH of the mixed solution was measured and adjusted to 6.5 to 7.5, and the resulting precipitate was collected by filtration and dried in a vacuum oven at 50° C. for 12 h to obtain an amide salt C, which was a branched amide salt.

(3) The concentrated unbranched amide salt solution B and the branched amide salt C were added to a high-temperature high-pressure reactor. 1% (based on total parts by weight) of a catalyst SHP was added, and the resulting mixture was first heated to 100° C. and kept at the temperature for 2 h to remove the solvent ethanol and water and then slowly heated to 150° C. and kept at the temperature for 2 h to allow prepolymerization. Gas was purged to remove water produced by the reaction to obtain a prepolymer with a specified viscosity, and the prepolymer was heated to 200° C. to 280° C. and subjected to a vacuum for about 6 h to remove water produced by the reaction. After the heating was stopped, the product was discharged through pressurization under a nitrogen atmosphere to obtain a finished PA copolymer product.

In the PA copolymer obtained in Example 2, the molar ratio of the unbranched amide salt to the branched amide salt was 97:3, which was calculated by the same process as described in Example 1.

Example 3

A preparation method of a branched PA copolymer with ultra-high toughness was provided, specifically including the following steps:

(1) 202 g of sebacic acid was added to 600 mL of ethanol, and the resulting mixture was heated to 60° C. for dissolution to obtain a dibasic acid solution. 116 g of dimethylpentanediamine was diluted with 200 mL of ethanol and then added dropwise to the dibasic acid solution, and the resulting mixed solution was mixed for about 10 h. The pH of the mixed solution was measured and adjusted to 6.5 to 7.5, and the mixed solution was heated for evaporating solvent and concentration to obtain an about 70% amide salt solution B in which the amide salt B was an unbranched amide salt.

(2) 10.7 g of sebacic acid was added to 40 mL of ethanol, and the resulting mixture was heated for dissolution to obtain a dibasic acid solution. 4.8 g of 1,3-diamino-2-propanol was diluted with 20 mL of ethanol and added dropwise to the dibasic acid solution, and the resulting mixed solution was mixed for about 10 h. The pH of the mixed solution was measured and adjusted to 6.5 to 7.5, and the resulting precipitate was collected by filtration and dried in a vacuum oven at 50° C. for 12 h to obtain an amide salt C, which was a branched amide salt.

(3) The concentrated unbranched amide salt solution B and the branched amide salt C were added to a high-temperature high-pressure reactor. 1% (based on total parts by weight) of a catalyst SHP was added, and the resulting mixture was first heated to 100° C. and kept at the temperature for 2 h to remove the solvent ethanol and water and then slowly heated to 150° C. and kept at the temperature for 2 h to allow prepolymerization. Gas was purged to remove water produced by the reaction to obtain a prepolymer with a specified viscosity, and the prepolymer was heated to 200° C. to 280° C. and subjected to a vacuum for about 6 h to remove water produced by the reaction. After the heating was stopped, the product was discharged through pressurization under a nitrogen atmosphere to obtain a finished PA copolymer product.

In the PA copolymer obtained in Example 3, the molar ratio of the unbranched amide salt to the branched amide salt was 95:5, which was calculated by the same process as described in Example 1.

Example 4

A preparation method of a branched PA copolymer with ultra-high toughness was provided, specifically including the following steps:

(1) 202 g of sebacic acid was added to 600 mL of ethanol, and the resulting mixture was heated to 60° C. for dissolution to obtain a dibasic acid solution. 116 g of dimethylpentanediamine was diluted with 200 mL of ethanol and then added dropwise to the dibasic acid solution, and the resulting mixed solution was mixed for about 10 h. The pH of the mixed solution was measured and adjusted to 6.5 to 7.5, and the mixed solution was heated for evaporating solvent and concentration to obtain an about 70% amide salt solution B in which the amide salt B was an unbranched amide salt.

(2) 22.5 g of sebacic acid was added to ethanol, and the resulting mixture was heated for dissolution to obtain a dibasic acid solution. 10 g of 1,3-diamino-2-propanol was diluted with ethanol and added dropwise to the dibasic acid solution, and the resulting mixed solution was mixed for about 10 h. The pH of the mixed solution was measured and adjusted to 6.5 to 7.5, and the resulting precipitate was collected by filtration and dried in a vacuum oven at 50° C. for 12 h to obtain an amide salt C, which was a branched amide salt.

(3) The concentrated unbranched amide salt solution B and the branched amide salt C were added to a high-temperature high-pressure reactor. 1% (based on total parts by weight) of a catalyst SHP was added, and the resulting mixture was first heated to 100° C. and kept at the temperature for 2 h to remove the solvent ethanol and water and then slowly heated to 150° C. and kept at the temperature for 2 h to allow prepolymerization. Gas was purged to remove water produced by the reaction to obtain a prepolymer with a specified viscosity, and the prepolymer was heated to 200° C. to 280° C. and subjected to a vacuum for about 6 h to remove water produced by the reaction. After the heating was stopped, the product was discharged through pressurization under a nitrogen atmosphere to obtain a finished PA copolymer product.

In the PA copolymer obtained in Example 4, the molar ratio of the unbranched amide salt to the branched amide salt was 90:10, which was calculated by the same process as described in Example 1.

Example 5

A preparation method of a branched PA copolymer with ultra-high toughness was provided, specifically including the following steps:

(1) 188 g of azelaic acid was added to 600 mL of ethanol, and the resulting mixture was heated to 60° C. for dissolution to obtain a dibasic acid solution. 116 g of dimethylpentanediamine was diluted with ethanol and then added dropwise to the dibasic acid solution, and the resulting mixed solution was mixed for about 10 h. The pH of the mixed solution was measured and adjusted to 6.5 to 7.5, and the mixed solution was heated for evaporating solvent and concentration to obtain an about 60% to 80% amide salt B solution in which the amide salt B was an unbranched amide salt.

(2) 9.9 g of azelaic acid was added to ethanol, and the resulting mixture was heated for dissolution to obtain a dibasic acid solution. 4.8 g of 1,3-diamino-2-propanol was diluted with ethanol and added dropwise to the dibasic acid solution, and the resulting mixed solution was mixed for about 10 h. The pH of the mixed solution was measured and adjusted to 6.5 to 7.5, and the resulting precipitate was collected by filtration and dried in a vacuum oven at 50° C. for 12 h to obtain an amide salt C, which was a branched amide salt.

(3) The concentrated unbranched amide salt solution B and the branched amide salt C were added to a high-temperature high-pressure reactor. 1% (based on total parts by weight) of a catalyst SHP was added, and the resulting mixture was first heated to 100° C. and kept at the temperature for 2 h to remove the solvent ethanol and water and then slowly heated to 150° C. and kept at the temperature for 2 h to allow prepolymerization. Gas was purged to remove water produced by the reaction to obtain a prepolymer with a specified viscosity, and the prepolymer was heated to 200° C. to 280° C. and subjected to a vacuum for about 6 h to remove water produced by the reaction. After the heating was stopped, the product was discharged through pressurization under a nitrogen atmosphere to obtain a finished PA copolymer product.

In the PA copolymer obtained in Example 5, the molar ratio of the unbranched amide salt to the branched amide salt was 95:5. The molar ratio was calculated as follows: the unbranched amide salt had a mass of 304 g and a relative molecular mass of 304 g/mol, and the branched amide salt had a mass of 14.7 g and a relative molecular mass of 278 g/mol, and thus the molar ratio of the two was calculated to be 95:5.

Comparative Example 1

A preparation method for a PA copolymer was provided, including the following steps:

(1) 202 g of sebacic acid was added to 600 mL of ethanol, and the resulting mixture was heated to 60° C. for dissolution to obtain a dibasic acid solution. 116 g of dimethylpentanediamine was diluted with 200 mL of ethanol and then added dropwise to the dibasic acid solution, and the resulting mixed solution was mixed for about 10 h. The pH of the mixed solution was measured and adjusted to 6.5 to 7.5, and the mixed solution was heated for evaporating solvent and concentration to obtain an about 70% amide salt solution B in which the amide salt B was an unbranched amide salt.

(2) The concentrated amide salt solution was added to a high-temperature high-pressure reactor. 1% (based on total parts by weight) of a catalyst SHP was added, and the resulting mixture was first heated to 100° C. and kept at the temperature for 2 h to remove the solvent ethanol and water and then slowly heated to 150° C. and kept at the temperature for 2 h to allow prepolymerization. Gas was purged to remove water produced by the reaction to obtain a prepolymer with a specified viscosity, and the prepolymer was heated to 200° C. to 280° C. and subjected to a vacuum for about 6 h to remove water produced by the reaction. After the heating was stopped, the product was discharged through pressurization under a nitrogen atmosphere to obtain a finished PA copolymer product.

In the PA copolymer obtained in Comparative Example 1, the molar ratio of the unbranched amide salt to the branched amide salt was 100:0.

Comparative Example 2

A preparation method for a PA copolymer was provided, including the following steps:

(1) 188 g of azelaic acid was added to 600 mL of ethanol, and the resulting mixture was heated to 60° C. for dissolution to obtain a dibasic acid solution. 116 g of dimethylpentanediamine was diluted with 200 mL of ethanol and then added dropwise to the dibasic acid solution, and the resulting mixed solution was mixed for about 10 h. The pH of the mixed solution was measured and adjusted to 6.5 to 7.5, and the mixed solution was heated for evaporating solvent and concentration to obtain an about 70% amide salt solution in which the amide salt was an unbranched amide salt.

(2) The concentrated unbranched amide salt solution and a branched amide salt were added to a high-temperature high-pressure reactor. 1% (based on total parts by weight) of a catalyst SHP was added, and the resulting mixture was first heated to 100° C. and kept at the temperature for 2 h to remove the solvent ethanol and water and then slowly heated to 150° C. and kept at the temperature for 2 h to allow prepolymerization. Gas was purged to remove water produced by the reaction to obtain a prepolymer with a specified viscosity, and the prepolymer was heated to 200° C. to 280° C. and subjected to a vacuum for about 6 h to remove water produced by the reaction. After the heating was stopped, the product was discharged through pressurization under a nitrogen atmosphere to obtain a finished PA copolymer product.

In the PA copolymer obtained in Comparative Example 2, the molar ratio of the unbranched amide salt to the branched amide salt was 100:0.

Experimental Data and Characterization:

FIG. 1 shows the structural formula of an amide salt produced from a dibasic acid and a diamine. The diamine with a side group can react with the dibasic acid to produce a salt. For example, the structural formulas of amide salts produced from the reaction of 1,3-diamino-2-propanol, dimethylpentanediamine, or 1,2-propanediamine with sebacic acid or azelaic acid are shown in FIG. 2 to FIG. 5, respectively.

The ultra-high toughness PA copolymer obtained through melt polycondensation of an amide salt includes a branched part and an unbranched part, and specific structural formulas of the two parts are as follows:

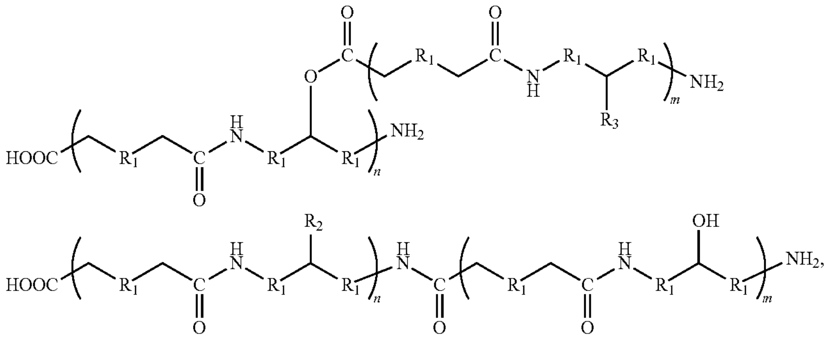

where $R_1$ on the main chain is one or more selected from the group consisting of methylene, cyclohexyl, and phenyl, the side group $R_2$ is methyl, and the side group $R_3$ is hydroxyl. There are ester bonds in branched molecular segments, and there are conventional PA segments in the unbranched part. n and m are both integers, $60 \leq n \leq 200$, and $0 \leq m \leq 20$.

Figure 6:
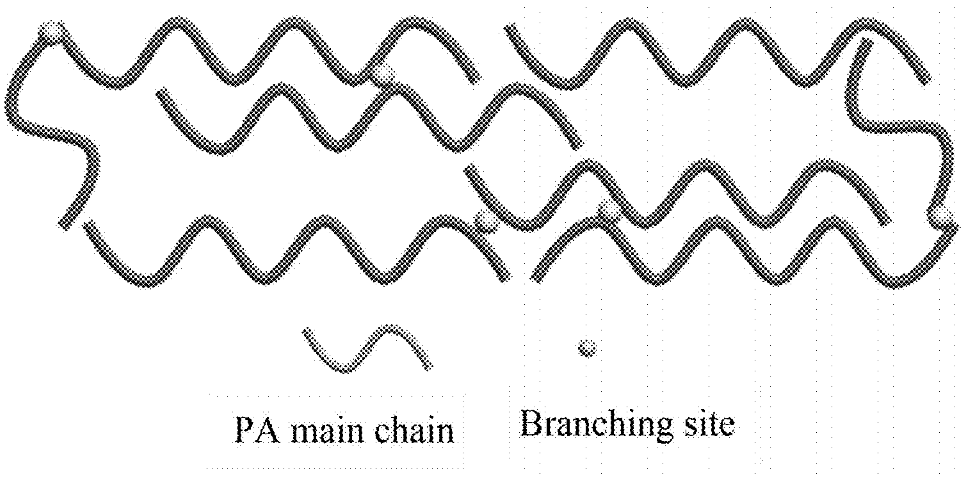
FIG. 6 shows a structural formula of a PA copolymer network obtained through melt polycondensation of an amide salt in an example of the present disclosure.

The schematic diagram of a structural formula of a PA copolymer network obtained through melt polycondensation of an amide salt is shown in FIG. 6.

Figure 7:
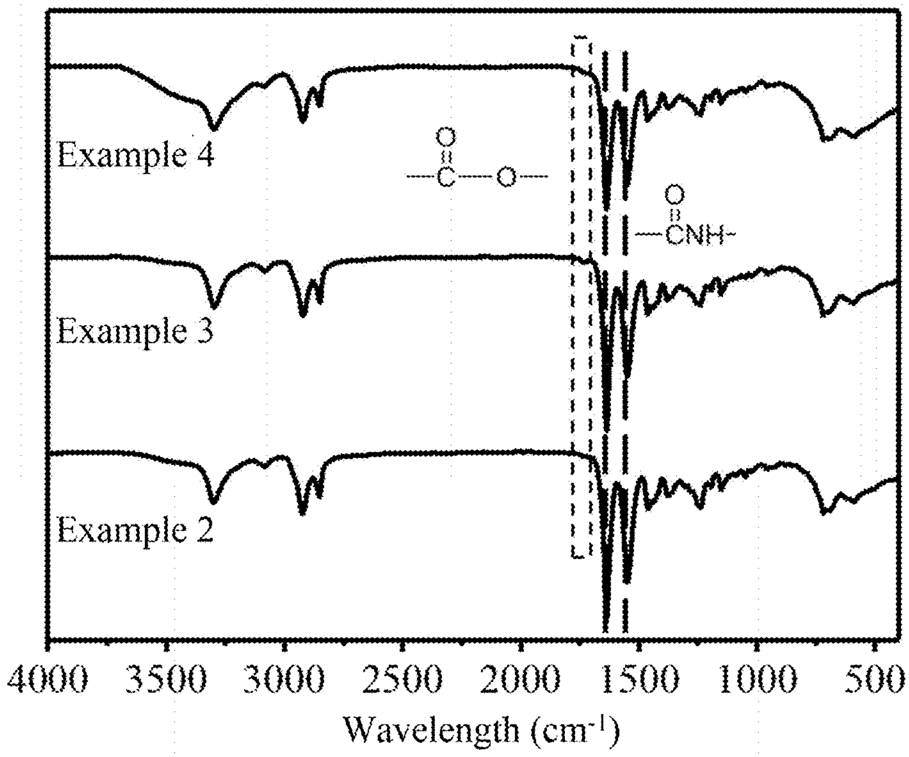
FIG. 7 shows the Fourier transform infrared spectroscopy (FTIR) spectra of the PA copolymers in Examples 2, 3, and 4 of the present disclosure.

The structure of a PA copolymer was characterized by FTIR, and results are shown in FIG. 7. It can be seen from the FTIR data of Examples 2, 3, and 4 that the ester group peak at 1,740 $cm^{-1}$ relatively increases with the increase of the branching degree, and the remaining peaks remain unchanged, indicating that the addition of the branched diamine does not significantly change the structure of the polymer.

According to the standard ISO 62 Method 4, the water absorption of the PA copolymer was tested, where after the product in Example 1 was placed at 50% humidity and 22° C. for 24 h, the water absorption was 0.45% to 0.48% and the total water absorption was 4.3% to 4.8%. When the product in Example 2 was placed at 50% humidity and 22° C. for 24 h, the water absorption was 0.43% to 0.47% and the total water absorption was 4.2% to 4.7%.

Figure 8B:
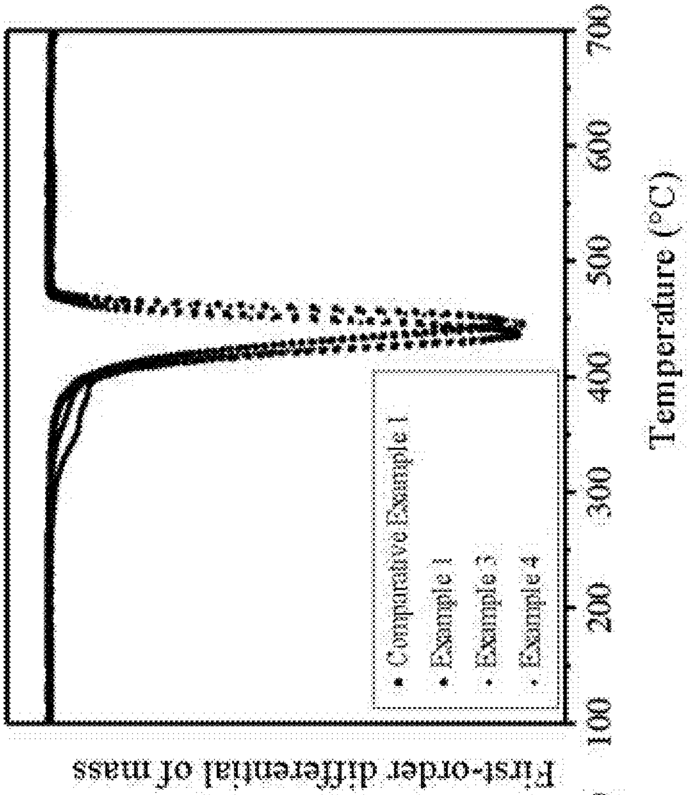
FIGS. 8A-8B show the thermogravimetric analysis (TGA) results of the PA copolymers in the examples and comparative examples of the present disclosure.
Figure 8A:
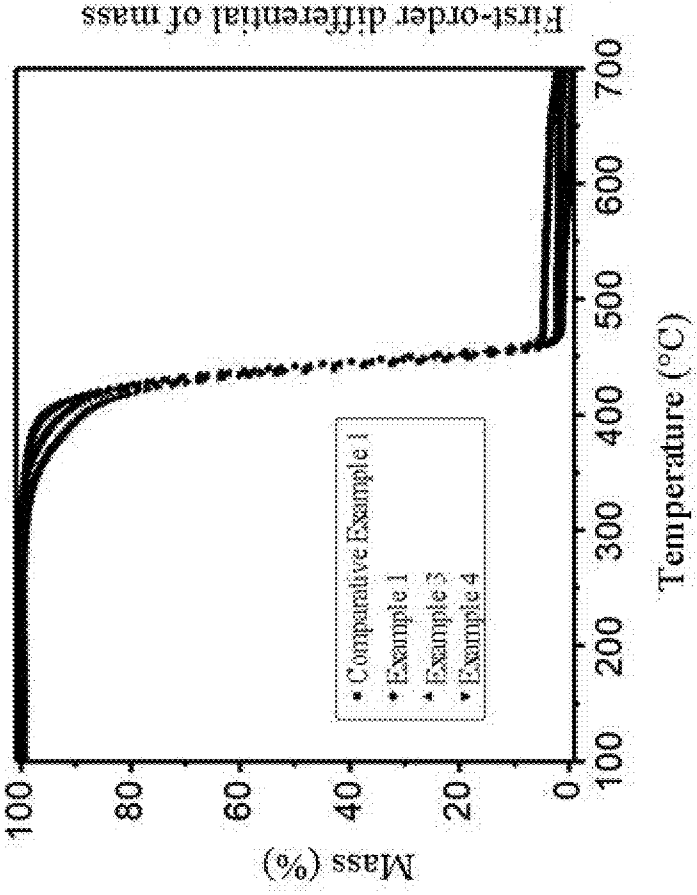

The thermal degradation properties of the PA copolymers were characterized by TGA, and the test results are shown in FIGS. 8A-8B. It can be seen that the PA copolymers have a degradation temperature of higher than 300° C., excellent thermal stability, and an initial degradation temperature of 320° C. to 350° C., where the initial degradation temperature decreases slightly with the increase of branching degree.

Figure 9:
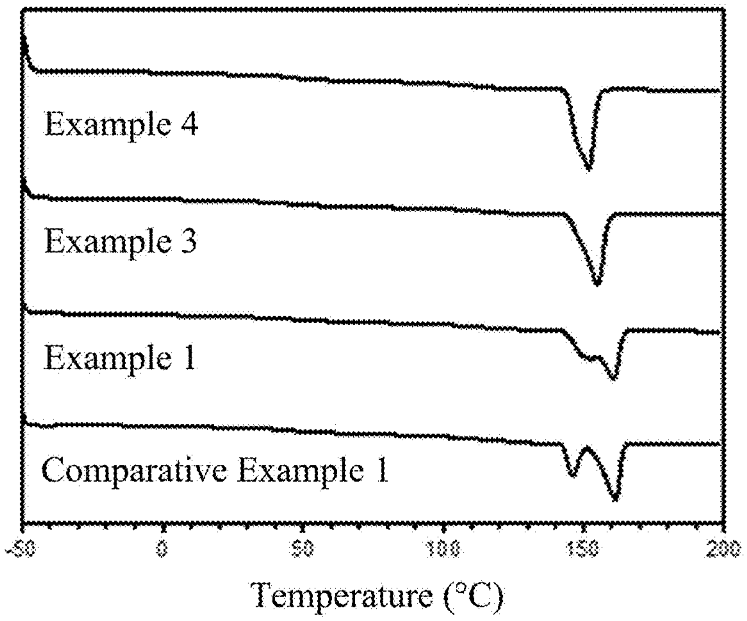
FIG. 9 shows the differential scanning calorimetry (DSC) curves of the PA copolymers in the examples and comparative examples of the present disclosure.

The thermodynamic properties such as glass transition temperature and the melting point of the PA copolymers were characterized by DSC, and the test results are shown in FIG. 9. It can be seen that the glass transition temperature does not change much and is about 35° C. to 40° C., but with the increase of branching degree, the melting point of each of the PA copolymers decreases from 162° C. to 151° C., and the melting peaks thereof also decreased, where the two melting peaks gradually became one melting peak.

APA copolymer was fabricated into a sheet by a vacuum molding machine, the sheet was cut into a standard stripe with a dumbbell-shaped cutter, and mechanical tensile properties thereof were tested at a tensile speed of 10 mm/min and an ambient temperature of 20° C. to 25° C. according to the standard ISO527-1. The test results are shown in Table 1 and FIGS. 10A-10B. It can be seen that, with the increase of branching degree, the strain of the PA copolymer decreases, the yield stress increases correspondingly, and the maximum stress first increases and then decreases due to strain reduction. The toughness of the PA copolymer also first increases and then decreases.

TABLE 1

Properties of the PA copolymers in Examples 1 to 5 and test results thereof

| Example | Glass transition temperature (° C.) | Melting point (° C.) | Tensile strength (MPa) | Elongation at break (%) | Initial degradation temperature (° C.) | Toughness ($MJ/M^3$) |
|---|---|---|---|---|---|---|
| Example 1 | 38.3 | 153.7 | 86.5 | 685 | 340-350 | 295.7 |
| Example 2 | 36.8 | 150.6 | 75 | 360 | 330-340 | 167.6 |
| Example 3 | 36.3 | 149.5 | 41 | 310 | 320-330 | 97.7 |
| Example 4 | 39.7 | 147.3 | 39 | 205 | 310-320 | 63.2 |
| Example 5 | 43.6 | 121.5 | 66.8 | 480 | 380-390 | 173.4 |
| Comparative Example 1 | 37.4 | 157.2 | 77.3 | 697 | 350-360 | 218.4 |
| Comparative Example 2 | 44.7 | 122.1 | 87.3 | 634 | 400-410 | 219.9 |

Figure 10A:
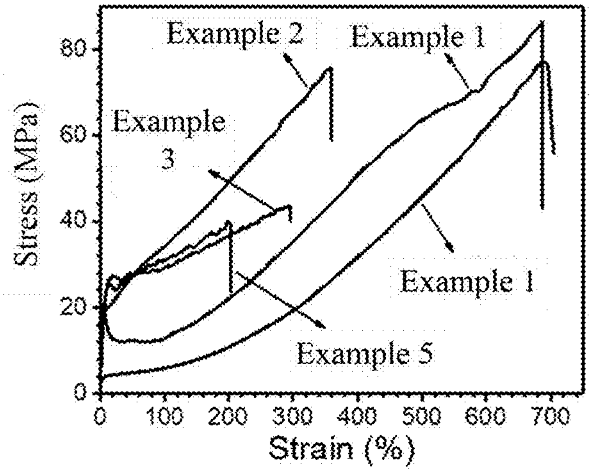
FIGS. 10A-10B show the mechanical tensile properties of the PA copolymers in the examples and comparative examples of the present disclosure.
Figure 10B:
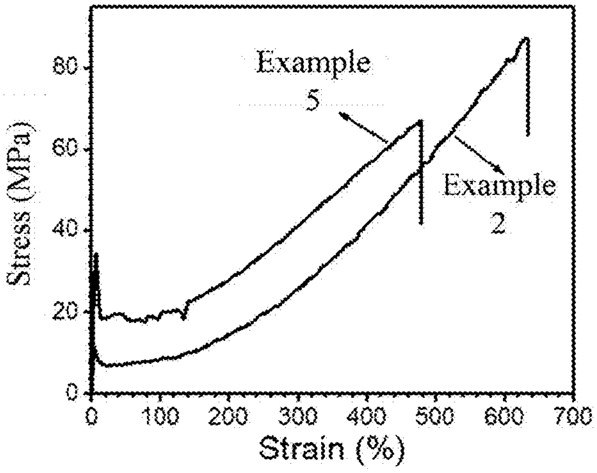

It can be seen from the mechanical performance analysis results in Table 1 and FIGS. 10A-10B that the yield strength of the PA copolymer prepared with the addition of a branched amide salt is greatly improved. The unbranched PA copolymer in Comparative Example 1 has a yield strength of about 5 MPa, the unbranched PA copolymer in Comparative Example 2 has a yield strength of about 10 MPa, and the branched PA copolymer has a yield strength of 20 MPa or more or even 30 MPa or more. At a relatively-low branching degree, as shown in Example 1, the toughness is further improved, and the toughness can be calculated to be 295.7 $MJ/M^3$ according to a stress-strain curve, which is greater than the toughness of the unbranched PA. At a high branching degree, the yield strength is further increased since a polymer network structure is fixed, but the toughness begins to decrease. Because the different polymer network structures formed at different branching degrees are different, the properties of a copolymer prepared through copolymerization of an unbranched amide salt solution with a branched amide salt are quite different from the properties of a polymer prepared with the unbranched amide salt alone.

Hydroxyl in the branched amide salt does not react with carboxyl at a low temperature. The condensation of carboxyl with amino mainly takes place in an early stage of the polymerization reaction, and a copolymer is mainly a product of a prepolymerization reaction. In a later stage of the reaction, an esterification reaction between carboxyl and hydroxyl takes place only after a temperature rises to 200° C. or higher to form a branched structure. The formed branched structure endows the polymer with superior properties.

Example 6

A preparation method for a bio-based nylon composite was provided, specifically including the following steps:

(1) 50 parts of nylon 6 and 50 parts of the PA copolymer in Example 1 were each dried for 12 h at 80° C. in a vacuum oven for later use in subsequent experiments. The nylon 6 in this example was purchased from ZIG SHENG INDUSTRIAL CO., LTD., Taiwan with item No. TP-4208.

(2) The pretreated materials (the 50 parts of nylon 6 and the 50 parts of the PA copolymer) obtained in step (1) and 0.5 part of pentaerythritol tetrakis[β-(3,5-di-tert-butyl-4-hydroxyphenyl)propanoate] were mixed and added to an internal mixer and blended for 10 min at a temperature of 220° C. and a rotational speed of 100 r/min.

(3) The bio-based nylon composite obtained in step (2) was pressed into a specified shape with a vacuum laminator at a temperature of 220° C. and a pressure of 2.5 MPa for testing.

Example 7

A preparation method for a bio-based nylon composite was provided, specifically including the following steps:

(1) 40 parts of nylon 6 and 60 parts of the PA copolymer in Example 1 were each dried for 12 h at 80° C. in a vacuum oven for later use in subsequent experiments. The nylon 6 in this example was purchased from ZIG SHENG INDUSTRIAL CO., LTD., Taiwan with item No. TP-4208.

(2) The pretreated materials (the 40 parts of nylon 6 and the 80 parts of the PA copolymer) obtained in step (1) and 0.5 part of pentaerythritol tetrakis[β-(3,5-di-tert-butyl-4-hydroxyphenyl)propanoate] were mixed and added to an internal mixer and blended for 10 min at a temperature of 220° C. and a rotational speed of 100 r/min.

(3) A bio-based nylon composite obtained in step (2) was pressed into a specified shape with a vacuum laminator at a temperature of 220° C. and a pressure of 2.5 MPa for testing.

Example 8

A preparation method for a bio-based nylon composite was provided, specifically including the following steps:

(1) 30 parts of nylon 6 and 70 parts of the PA copolymer in Example 1 were each dried for 8 h at 80° C. in a vacuum oven for later use in subsequent experiments. The nylon 6 in this example was purchased from ZIG SHENG INDUSTRIAL CO., LTD., Taiwan with item No. TP-4208.

(2) The pretreated materials (the 30 parts of nylon 6 and the 70 parts of the PA copolymer) obtained in step (1) and 0.5 part of pentaerythritol tetrakis[β-(3,5-di-tert-butyl-4-hydroxyphenyl)propanoate] were mixed and added to an internal mixer and blended for 10 min at a temperature of 220° C. and a rotational speed of 100 r/min.

(3) A bio-based nylon composite obtained in step (2) was pressed into a specified shape with a vacuum laminator at a temperature of 220° C. and a pressure of 2.5 MPa for testing.

Example 9

A preparation method for a bio-based nylon composite was provided, specifically including the following steps:

(1) 20 parts of nylon 6 and 80 parts of the PA copolymer in Example 1 were each dried for 12 h at 80° C. in a vacuum oven for later use in subsequent experiments. The nylon 6 in this example was purchased from ZIG SHENG INDUSTRIAL CO., LTD., Taiwan with item No. TP-4208.

(2) The pretreated materials (the 20 parts of nylon 6 and the 80 parts of the PA copolymer) obtained in step (1) and 0.5 part of pentaerythritol tetrakis[β-(3,5-di-tert-butyl-4-hydroxyphenyl)propanoate] were mixed and added to an internal mixer and blended for 10 min at a temperature of 220° C. and a rotational speed of 100 r/min.

(3) A bio-based nylon composite obtained in step (2) was pressed into a specified shape with a vacuum laminator at a temperature of 220° C. and a pressure of 2.5 MPa for testing.

Comparative Example 3

(1) 100 parts of nylon 6 were dried for 12 h at 80° C. in a vacuum oven for later use in subsequent experiments. Because nylon 6 easily absorbs water, it was vacuum-heated and dried to remove moisture from the nylon. The nylon 6 in this example was purchased from ZIG SHENG INDUSTRIAL CO., LTD., Taiwan with item No. TP-4208.

(2) The pretreated material (the 100 parts of nylon 6) obtained in step (1) and 0.5 part of an antioxidant were mixed and added to an internal mixer and blended for 10 min at a temperature of 220° C. and a rotational speed of 100 r/min to obtain a nylon composite.

(3) The nylon composite obtained in step (2) was pressed into a specified shape with a vacuum laminator at a temperature of 220° C. and a pressure of 2.5 MPa for testing.

Comparative Example 4

(1) 100 parts of a PA copolymer were dried for 12 h at 80° C. in a vacuum oven for later use in subsequent experiments.

(2) The pretreated material (the 100 parts of the PA copolymer) obtained in step (1) and 0.5 part of an antioxidant were mixed and added to an internal mixer and blended for 10 min at a temperature of 220° C. and a rotational speed of 100 r/min.

(3) A bio-based PA composite obtained in step (2) was pressed into a specified shape with a pressing machine at a temperature of 180° C. and a pressure of 2.5 Mpa for testing.

The tensile properties, notch impact resistance, and water absorption of the bio-based PA composites prepared in Examples 6 to 9 and Comparative Examples 3 and 4 were each tested in accordance with relevant standards, where test methods were known in the prior art. The notch impact resistance was tested with reference to ISO179-1 2020, the tensile properties were tested with reference to ISO527-1, and the water absorption was tested with reference to ISO 62 Method 4.

Figure 11:
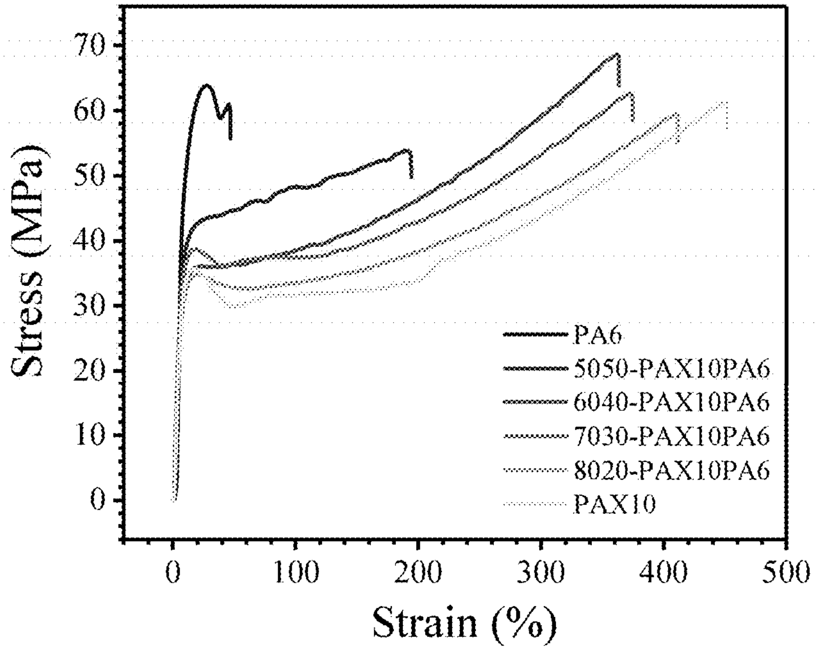
FIG. 11 shows the stress-strain curves of the bio-based nylon composites in the examples and comparative examples of the present disclosure, where 5050-PAX10PA6 represents Example 6, 6040-PAX10PA6 represents Example 7, 7030-PAX10PA6 represents Example 8, and 8020-PAX10PA6 represents Example 9.

The test results are as follows:

(1) The performance test results of the bio-based PA composites are shown in Table 2, and FIG. 11 shows the stress-strain curves of the bio-based nylon composites.

TABLE 2

Statistical results of performance test data of bio-based nylon composites

| Performance | Young's modulus (GPa) | Tensile strength (MPa) | Elongation at break (%) | Toughness ($MJ/m^3$) | Notch impact resistance ($KJ/m^2$) |
|---|---|---|---|---|---|
| Comparative Example 3 | 1.0 | 63.8 | 46.6 | 24.5 | 4.3 |
| Example 6 | 2.1 | 53.8 | 193.2 | 90.4 | 4.5 |
| Example 7 | 3.6 | 68.6 | 362.6 | 170.0 | 4.3 |
| Example 8 | 3.8 | 62.6 | 373.1 | 166.3 | 4.1 |
| Example 9 | 4.1 | 59.4 | 411.1 | 169 | 4.7 |
| Comparative Example 4 | 4.5 | 61.3 | 451.4 | 181.5 | 4.9 |

Figure 12:
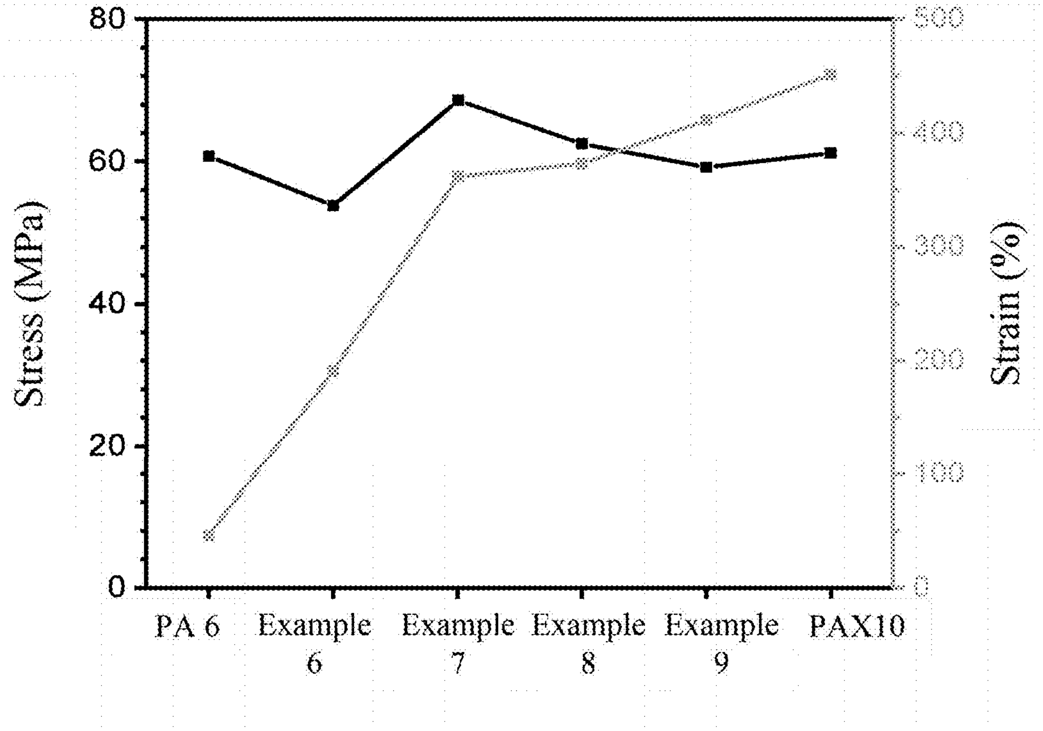
FIG. 12 shows the comparison of fracture stress and fracture strain among the bio-based nylon composites in Examples 6 to 10 of the present disclosure.

It can be seen from Table 2 and FIG. 11 and FIG. 12 that the blending of a PA copolymer with nylon 6 leads to a significant toughening effect. When a PA copolymer and nylon 6 are blended in a ratio of 50:50, the resulting bio-based nylon composite exhibits an elongation at break that increased to 193.2%, a Young's modulus that increased from 1 GP to 2.1 GPa, and a toughness that increased from 24.5 $MJ/m^3$ to 90.4 $MJ/m^3$, which are all significantly improved.

When a PA copolymer and nylon 6 are blended in a ratio of 60:40, the resulting composite exhibits a tensile breaking strength of 68.6 MPa, an elongation at break of 362.6% (the fracture strain is 7.8 times that of pure nylon 6), and a toughness that increased to 170 $MJ/m^3$ (which is 7 times that of pure nylon 6). When a PA copolymer and nylon 6 are blended in ratios of 70:30 and 80:20, resulting composites each exhibit an improved Young's modulus, and the elongation at break increases with the increase of a PA copolymer content. It can be clearly seen that when the PA copolymer in the present disclosure is compounded with nylon 6, the fracture strain, toughness, Young's modulus, and the like of the material are greatly improved without reducing the fracture stress.

Figure 13:
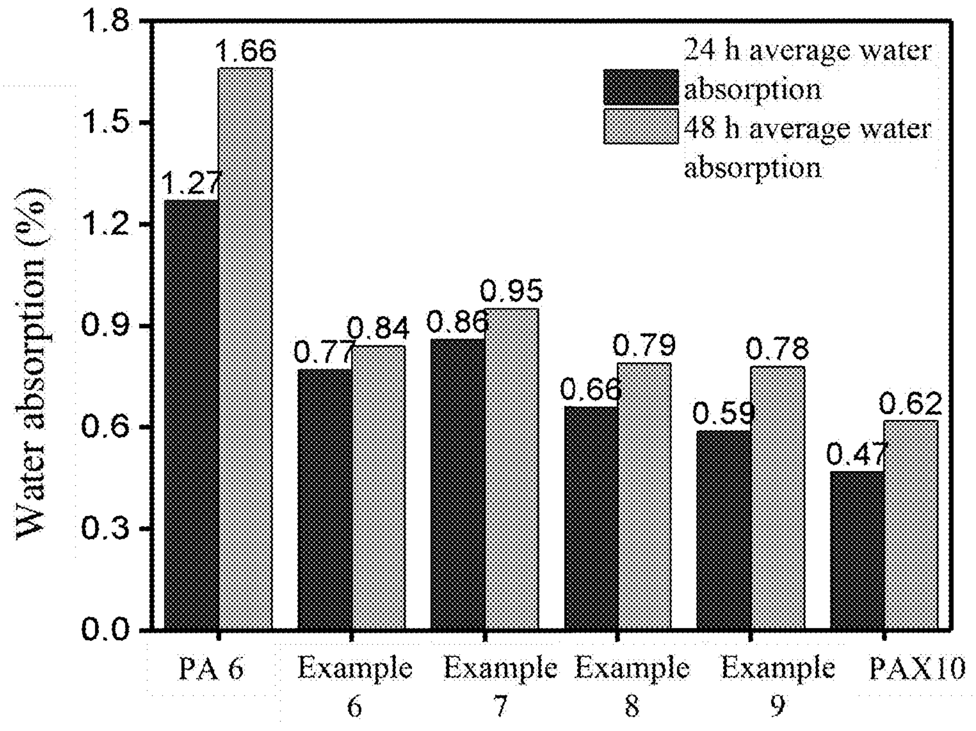
FIG. 13 shows the test data of water absorption of the bio-based nylon composites in the examples and comparative examples of the present disclosure.

The water absorption of the bio-based nylon composites is tested with reference to ISO 62 Method 4. Apparently, it can be seen from FIG. 13 that the bio-based nylon composite can significantly reduce the water absorption of nylon 6. The pure nylon 6 resin has a 24 h saturated water absorption of 1.27% and a 48 h saturated water absorption that increased to 1.66%. After 50% of a PA copolymer is added, a 24 h saturated water absorption is decreased to 0.77% and a 48 h saturated water absorption is increased to 0.84%. Compared with the pure nylon 6 resin, the bio-based nylon composite has significantly-reduced water absorption, but the 48 h water absorption does not change significantly. It can be easily concluded that the addition of a PA copolymer can significantly reduce the water absorption of nylon 6.

Example 10

A preparation method of a PA fiber was provided, specifically including the following steps:

(1) 1,000 parts of the PA copolymer in Example 1 were dried for 8 h at 60° C. in a vacuum oven for later use in subsequent experiments. Amido bonds had prominent affinity with water, and thus, the moisture in the raw material was removed by vacuum-drying.

(2) The pretreated material obtained in step (1) and 5 parts of n-octadecyl β-(3,5-di-tert-butyl-4-hydroxyphenyl)propionate (the antioxidant 1076) were mixed, added to a hopper of a melt spinning machine, preheated at 100° C., melted at 200° C., and extruded through a spinneret at 200° C. with a rolling-out speed of 100 r/min to obtain a PA fiber, which was named Fiber-1.

(3) The fiber obtained in step (2) was subjected to cyclic tension twice with a cyclic gauge length of 600% to obtain a reinforced fiber.

Example 11

A preparation method for a PA fiber was provided, specifically including the following steps:

(1) 1,000 parts of the PA copolymer in Example 1 were dried for 8 h at 60° C. in a vacuum oven for later use in subsequent experiments. Amido bonds had a prominent affinity with water, and thus, the moisture in the raw material was removed by vacuum-drying.

(2) The pretreated material obtained in step (1) and 5 parts of n-octadecyl β-(3,5-di-tert-butyl-4-hydroxyphenyl)propionate were mixed, added to a hopper of a melt spinning machine, preheated at 100° C., melted at 200° C., and extruded through a spinneret at 200° C. with a rolling-out speed of 200 r/min to obtain a PA fiber, which was named Fiber-2.

(3) The fiber obtained in step (2) was subjected to cyclic tension twice with a cyclic gauge length of 600% to obtain a reinforced fiber.

Example 12

A preparation method for a PA fiber was provided, specifically including the following steps:

(1) 1,000 parts of the PA copolymer in Example 1 were dried for 8 h at 60° C. in a vacuum oven for later use in subsequent experiments. Amido bonds had a prominent affinity with water, and thus, the moisture in the raw material was removed by vacuum-drying.

(2) The pretreated material obtained in step (1) and 5 parts of n-octadecyl β-(3,5-di-tert-butyl-4-hydroxyphenyl)propionate were mixed, added to a hopper of a melt spinning machine, preheated at 100° C., melted at 200° C., and extruded through a spinneret at 200° C. with a rolling-out speed of 300 r/min to obtain a PA fiber, which was named Fiber-3.

(3) The fiber obtained in step (2) was subjected to cyclic tension twice with a cyclic gauge length of 600% to obtain a reinforced fiber.

Example 13

A preparation method of a PA fiber was provided, specifically including the following steps:

(1) 1,000 parts of the PA copolymer in Example 1 were dried for 8 h at 60° C. in a vacuum oven for later use in subsequent experiments. Amido bonds had a prominent affinity with water, and thus the moisture in the raw material was removed by vacuum-drying.

(2) The pretreated material obtained in step (1) and 5 parts of n-octadecyl β-(3,5-di-tert-butyl-4-hydroxyphenyl)propionate were mixed, added to a hopper of a melt spinning machine, preheated at 100° C., melted at 200° C., and extruded through a spinneret at 200° C. with a rolling-out speed of 400 r/min to obtain a PA fiber, which was named Fiber-4.

(3) The fiber obtained in step (2) was subjected to cyclic tension twice with a cyclic gauge length of 600% to obtain a reinforced fiber.

Example 14

A preparation method for a PA fiber was provided, specifically including the following steps:

(1) 1,000 parts of the PA copolymer in Example 1 were dried for 8 h at 60° C. in a vacuum oven for later use in subsequent experiments. Amido bonds had a prominent affinity with water, and thus, the moisture in the raw material was removed by vacuum-drying.

(2) The pretreated material obtained in step (1) and 5 parts of n-octadecyl β-(3,5-di-tert-butyl-4-hydroxyphenyl)propionate were mixed, added to a hopper of a melt spinning machine, preheated at 100° C., melted at 200° C., and extruded through a spinneret at 200° C. with a rolling-out speed of 500 r/min to obtain a PA fiber, which was named Fiber-4.

(3) The fiber obtained in step (2) was subjected to cyclic tension twice with a cyclic gauge length of 600% to obtain a reinforced fiber.

Example 15

This example was different from Example 10 in that the PA copolymer was used in 1 part by weight and the antioxidant was used in 1 part by weight.

Example 16

This example was different from Example 10 in that the PA copolymer was used in 500 parts by weight and the antioxidant was used in 3 parts by weight.

Experimental Data and Analysis:

The tensile properties are tested with reference to the standard ISO527-1.

Figure 14:
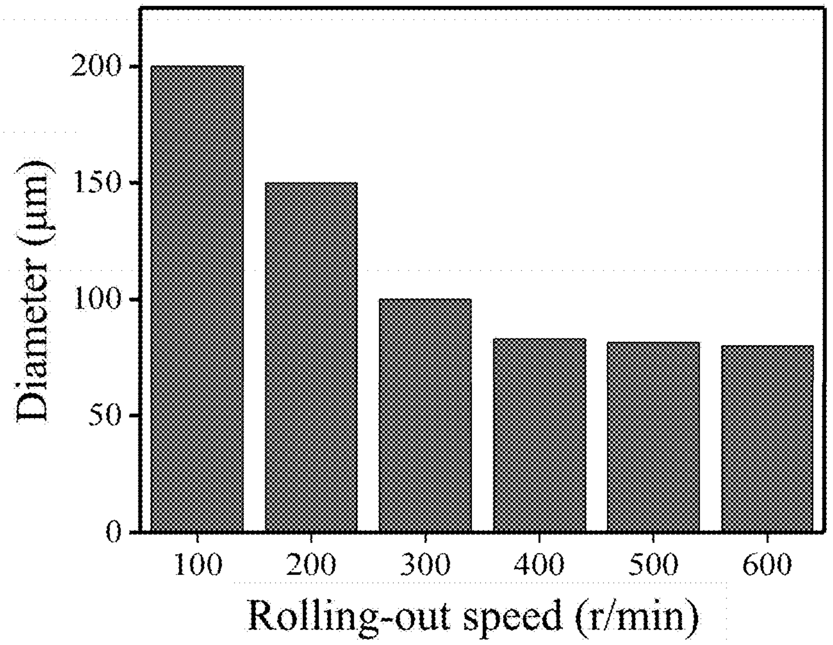
FIG. 14 is a bar chart illustrating a diameter change of the fibers in Examples 10 to 14 of the present disclosure with a rolling-out speed change.

(1) FIG. 14 is a bar chart illustrating a diameter change of the fibers with a rolling-out speed change. The fiber diameter is measured by an optical microscope, and it can be seen that the fiber diameter decreases with the increase of a rolling-out speed. When the rolling-out speed is 100 r/min, the fiber diameter is 200 μm. When the rotational speed is increased to 200 r/min, the fiber diameter is 150 μm. When the rotational speed is 300 r/min, the fiber diameter is about 100 μm. However, when the rolling-out speed is 400 r/min to 500 r/min, the fiber diameter is 80 μm.

Figure 15:
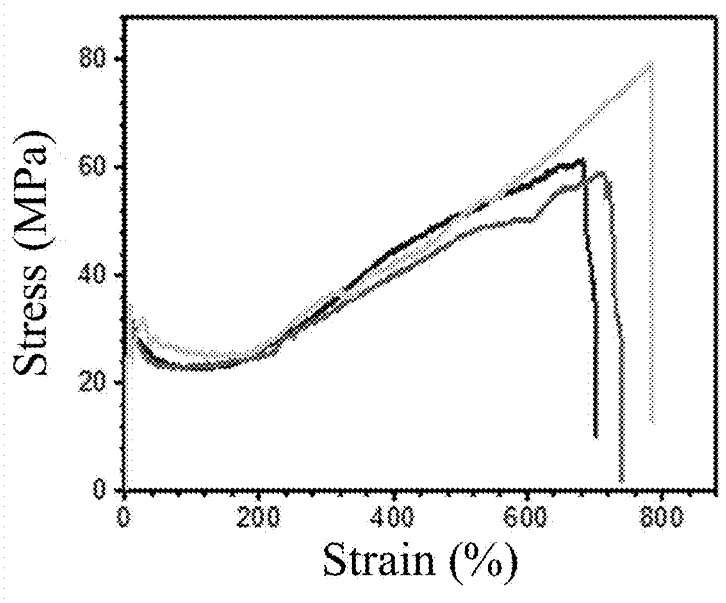
FIG. 15 shows the tensile curves of the fiber obtained in Example 10 of the present disclosure that is not treated.

(2) FIG. 15 shows tensile curves of the fiber obtained in step (2) of Example 10 that is not treated. The multiple curves in this figure show parallel test results of the same sample, and it can be seen that the fiber has a fracture strain of about 800% and fracture stress as high as 80 MPa. Compared with the fibers on the market, the fiber of the present disclosure has prominent mechanical performance. For example, the polyester fiber has a strength of 25 MPa and a fracture strain of 19.2%; the nylon 6 fiber has a strength of 59.25 MPa and a fracture strain of 48.62%; the polypropylene (PP) fiber has a strength of 6.84 MPa and a fracture strain of 17.68%.

Figure 16:
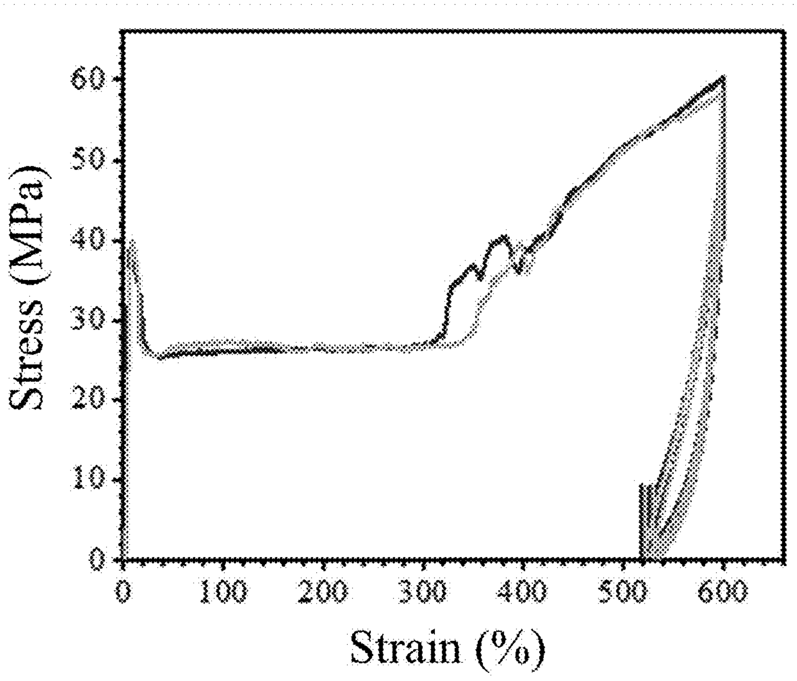
FIG. 16 shows the stress-strain curves of the fiber obtained in Example 10 of the present disclosure that undergoes cyclic tension.

(3) FIG. 16 shows tensile curves of the fiber in step (3) of Example 10 that undergoes cyclic tension. The multiple curves in the figure show parallel test results of the same sample. It can be seen that, during the first cyclic tension, a raw yarn undergoes a large plastic deformation in a front-end yield stage, and curves of the subsequent cycles are close to an equilibrium steady state.

Figure 17:
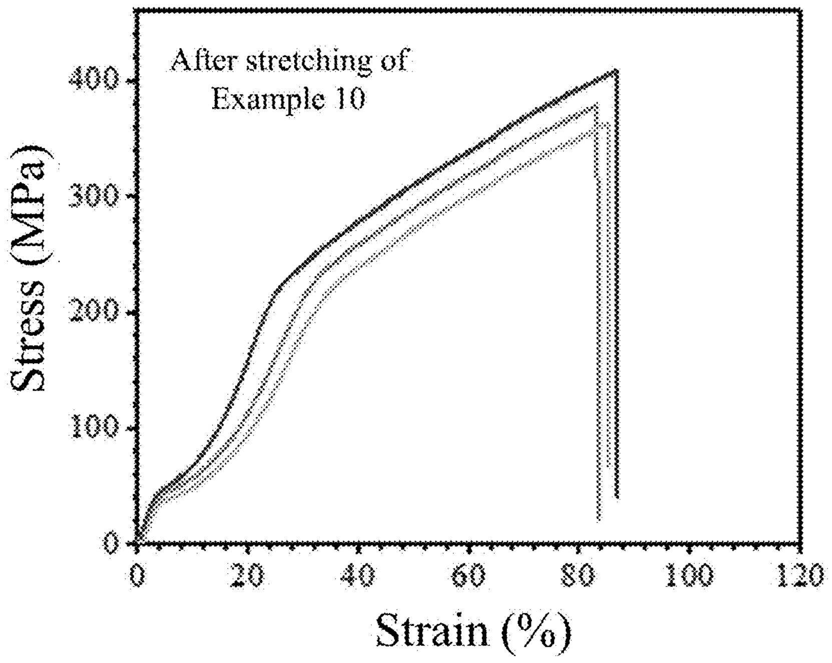
FIG. 17 shows the stress-strain curves of the fiber obtained in Example 10 of the present disclosure after cyclic tension.

(4) FIG. 17 shows stress-strain curves of the fiber obtained in Example 10 that undergoes cyclic tension. The multiple curves in the figure show parallel test results of the same sample. It can be seen that, after the cyclic tension, the breaking strength of the fiber can reach 400 MPa and the fracture strain can be about 85%. The properties of the material obtained after cyclic tension have a high reference value for practical application, and the PA fiber of the present disclosure obtained after the cyclic tension has a prominent reinforcing effect.

Figure 18:
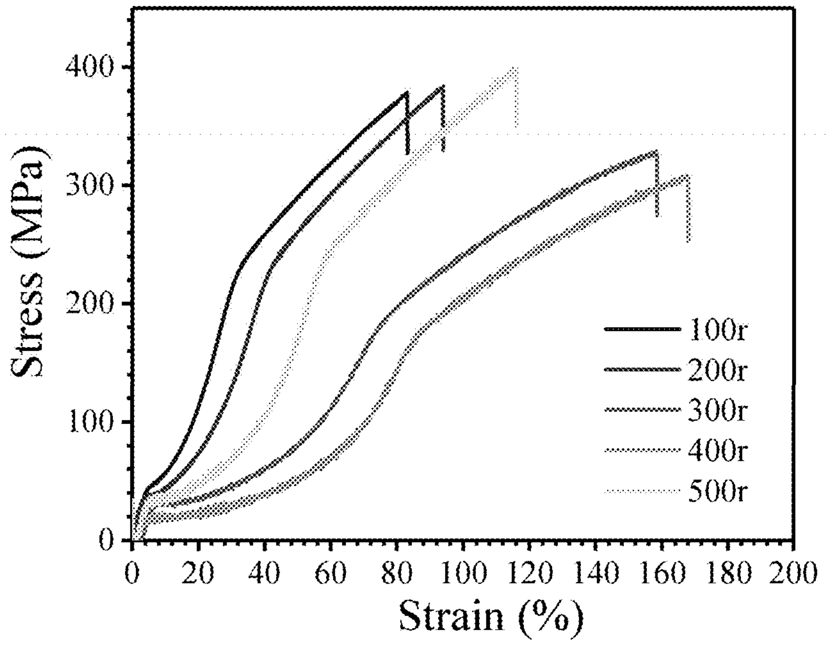
FIG. 18 shows the comparison of mechanical performance among the fibers in Examples 10 to 14 of the present disclosure.

(5) Fiber 1 to Fiber 5 obtained at different rolling-out speeds are treated by the same method, and the resulting tensile curves are shown in FIG. 18. It can be seen that the tensile strength is the highest when the rolling-out speed is 100 r/min, and the fracture strain is relatively increased when the rolling-out speed is increased to 200 r/min. When the rolling-out speed is further increased, the mechanical strength is decreased and the fracture strain is increased, as shown by fiber 3 to fiber 4. However, when the rolling-out speed is increased to 500 r/min, the mechanical strength of the fiber is increased, which is related to the reduction of fiber diameter.

Example 17

A preparation method for a PLA composite was provided, specifically including the following steps:

(1) 90 parts of PLA and 10 parts of the PA copolymer in Example 1 were each dried for 12 h at 80° C. in a vacuum oven for later use in subsequent experiments. The PLA in this example was purchased from Natureworks in the United States with item No. 4032D.

(2) The pretreated materials (the 90 parts of PLA and the 10 parts of the PA copolymer) obtained in step (1) and 0.5 part of an antioxidant were mixed and added to an internal mixer and blended for 10 min at a temperature of 180° C. and a rotational speed of 100 r/min.

(3) A PLA composite obtained in step (2) was pressed into a specified shape with a pressing machine at a temperature of 180° C. and a pressure of 2.5 MPa for testing.

Example 18

A preparation method for a PLA composite was provided, specifically including the following steps:

(1) 95 parts of PLA and 5 parts of the PA copolymer in Example 1 were each dried for 12 h at 80° C. in a vacuum oven for later use in subsequent experiments. The PLA in this example was purchased from Natureworks in the United States with item No. 4032D.

(2) The pretreated materials (the 95 parts of PLA and the 5 parts of the PA copolymer) obtained in step (1) and 0.5 part of pentaerythritol tetrakis[β-(3,5-di-tert-butyl-4-hydroxyphenyl)propanoate] were mixed and added to an internal mixer and blended for 10 min at a temperature of 180° C. and a rotational speed of 100 r/min.

(3) A PLA composite obtained in step (2) was pressed into a specified shape with a pressing machine at a temperature of 180° C. and a pressure of 2.5 Mpa for testing.

Example 19

A preparation method for a PLA composite was provided, specifically including the following steps:

(1) 98 parts of PLA and 2 parts of the PA copolymer in Example 1 were each dried for 8 h at 80° C. in a vacuum oven for later use in subsequent experiments. The PLA in this example was purchased from Natureworks in the United States with Item No. 4032D.

(2) The pretreated materials (the 98 parts of PLA and the 2 parts of the PA copolymer) obtained in step (1) and 0.5 part of pentaerythritol tetrakis[β-(3,5-di-tert-butyl-4-hydroxyphenyl)propanoate] were mixed and added to an internal mixer and blended for 10 min at a temperature of 180° C. and a rotational speed of 100 r/min.

(3) A PLA composite obtained in step (2) was pressed into a specified shape with a pressing machine at a temperature of 180° C. and a pressure of 2.5 Mpa for testing.

Example 20

A preparation method for a PLA composite was provided, specifically including the following steps:

(1) 99 parts of PLA and 1 part of the PA copolymer in Example 1 were each dried for 12 h at 80° C. in a vacuum oven for later use in subsequent experiments. The PLA in this example was purchased from Natureworks in the United States with Item No. 4032D.

(2) The pretreated materials (the 99 parts of PLA and the 1 part of the PA copolymer) obtained in step (1) and 0.5 part of pentaerythritol tetrakis[β-(3,5-di-tert-butyl-4-hydroxyphenyl)propanoate] were mixed and added to an internal mixer and blended for 10 min at a temperature of 180° C. and a rotational speed of 100 r/min.

(3) A PLA composite obtained in step (2) was pressed into a specified shape with a pressing machine at a temperature of 180° C. and a pressure of 2.5 Mpa for testing.

Example 21

This example was different from Example 17 in that the PLA was used in 50 parts by weight, the PA copolymer in Example 1 was used in 50 parts by weight, and the pentaerythritol tetrakis[β-(3,5-di-tert-butyl-4-hydroxyphenyl) propanoate] was used in 1 part by weight.

Comparative Example 5

A preparation method of a PLA composite was provided, including the following steps:

(1) 100 parts of PLA were dried for 12 h at 80° C. in a vacuum oven for later use in subsequent experiments. Because the PLA was easy to absorb water, it was vacuum-heated and dried to remove moisture in the PLA. The PLA in this example was purchased from Natureworks in the United States with Item No. 4032D.

(2) The pretreated material (the 100 parts of PLA) obtained in step (1) and 0.5 part of pentaerythritol tetrakis [β-(3,5-di-tert-butyl-4-hydroxyphenyl)propanoate] were mixed and added to an internal mixer and blended for 10 min at a temperature of 180° C. and a rotational speed of 100 r/min.

(3) A pure PLA material obtained in step (2) was pressed into a specified shape with a pressing machine at a temperature of 180° C. and a pressure of 2.5 MPa for testing.

Comparative Example 6

(1) 100 parts of the PA copolymer in Example 1 were dried for 12 h at 80° C. in a vacuum oven for later use in subsequent experiments.

(2) The pretreated material (the 100 parts of the PA copolymer) obtained in step (1) and 0.5 part of pentaerythritol tetrakis[β-(3,5-di-tert-butyl-4-hydroxyphenyl)propanoate] were mixed and added to an internal mixer and blended for 10 min at a temperature of 180° C. and a rotational speed of 100 r/min.

(3) A bio-based PA material obtained in step (2) was pressed into a specified shape with a pressing machine at a temperature of 180° C. and a pressure of 2.5 Mpa for testing.

The tensile properties of the PLA composites prepared in Examples 17 to 20 and Comparative Examples 5 and 6 were tested according to the standard ISO527-1.

Figure 19:
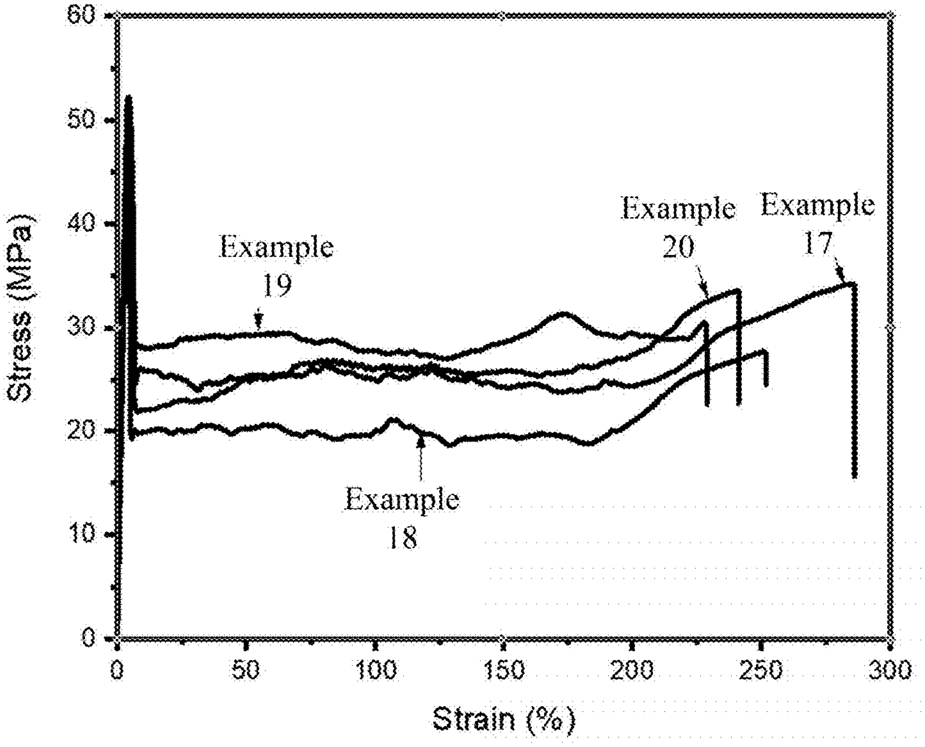
FIG. 19 shows the stress-strain curves of the PLA composites in Examples 6 to 9 of the present disclosure.

The test results are as follows:

(1) The performance test results of the PLA composites are shown in Table 3, and FIG. 19 shows the stress-strain curves of the bio-based nylon composites.

TABLE 3

Statistical results of performance test data of the PLA composites

| Performance | Tensile strength (MPa) | Elongation at break (%) | Glass transition temperature (° C.) | Melting point (° C.) | Tensile toughness $MJ/m^3$ |
|---|---|---|---|---|---|
| Comparative Example 5 | 66.3 | 4.3 | 60-65 | 176 | 1.81 |
| Example 17 | 40.3 | 285.1 | 59.7 | 164.09 | 74.94 |
| Example 18 | 42.2 | 260.3 | 59.8 | 164.39 | 53.04 |
| Example 19 | 48.1 | 232.4 | 59.56 | 163.81 | 66.05 |
| Example 20 | 52.8 | 241.6 | 60.1 | 167.24 | 37.50 |
| Comparative Example 6 | 62.3 | 526.3 | 40 | 160 | 211.23 |

Figure 20:
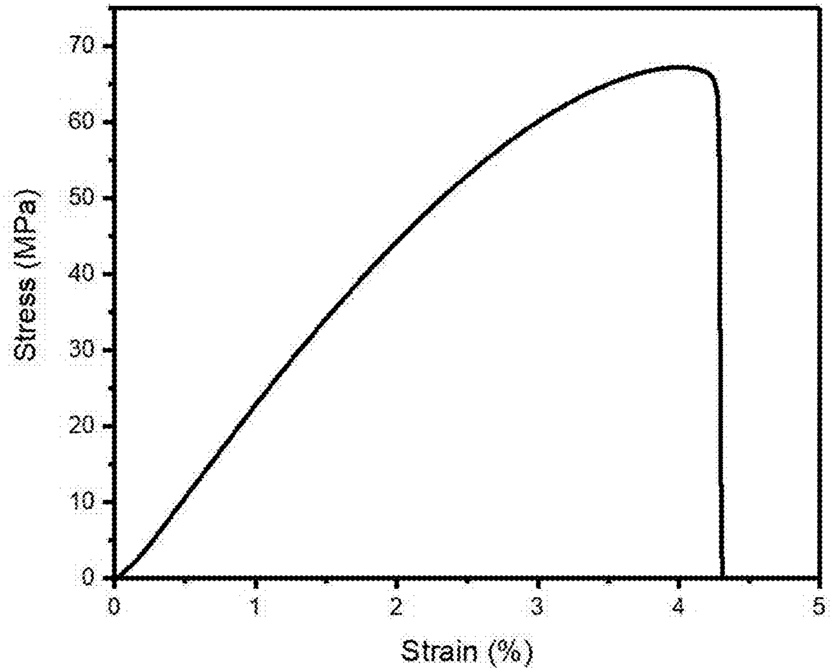
FIG. 20 shows the stress-strain curve of the PLA material used in Comparative Example 1 of the present disclosure.
Figure 21:
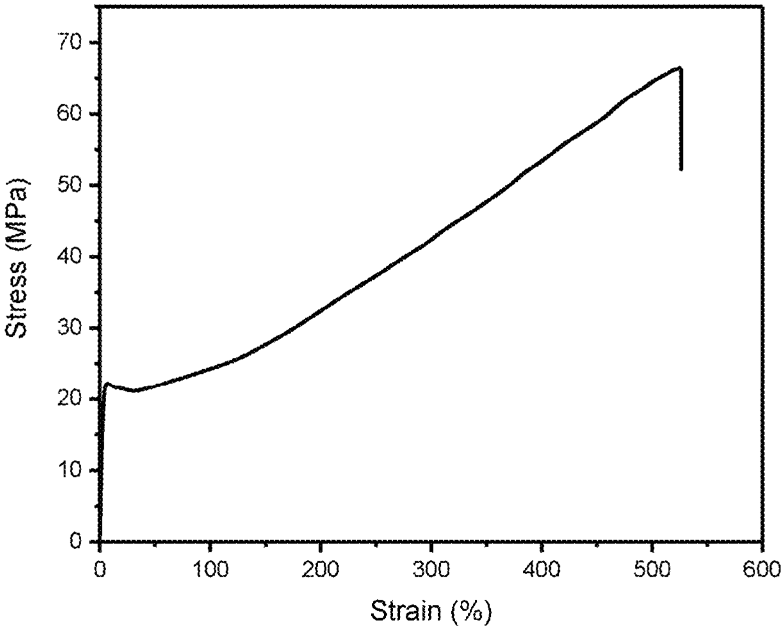
FIG. 21 shows the stress-strain curve of the bio-based nylon material used in Examples 6 to 9 of the present disclosure.

It can be seen from Table 3 and FIG. 19 to FIG. 21 that the blending of PLA with the PA copolymer leads to a significant toughening effect. When PLA and PAX10 are blended in a ratio of 90:10, the resulting PLA composite has a tensile strength of 40.3 MPa and an elongation at break that increased to 285.1%, which is 70 times that of pure PLA, indicating a significant toughening effect. When PLA and PAX10 are blended in a ratio of 95:5, the resulting composite exhibits a tensile breaking strength of 42.2 MPa and an elongation at break of 260.3%.

When PLA and PAX10 are blended in ratios of 98:8 and 99:1, the resulting composites each exhibit a significantly-improved elongation at break, and the elongation at break increases with the increase of a PA copolymer content. It can be clearly seen that, when the PLA in the present disclosure is compounded with the PA copolymer PAX10, the fracture strain of the material is greatly improved with a slight reduction of the fracture stress. The PA copolymers in Examples 2 to 5 can also each be blended with PLA to obtain a composite with prominent mechanical performance.

Figure 22:
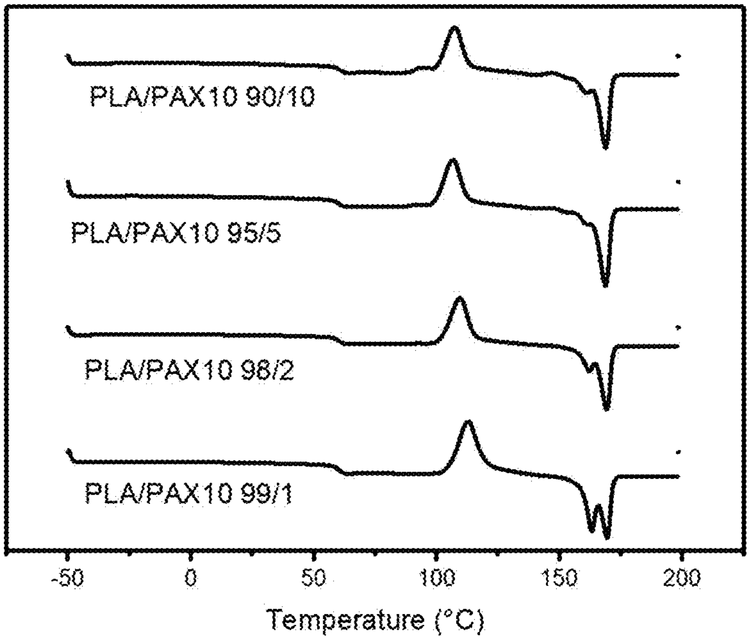
FIG. 22 shows the DSC test results of the PLA composites in Examples 6 to 9 of the present disclosure.

It can be seen from FIG. 22 that the PLA composite has only one of the glass transition temperatures and melting points, indicating that PLA has excellent compatibility with the PA copolymer, and thus the two can be well blended without the addition of a compatibilizer. It can be concluded from the comparison of the PA copolymers in Examples 2 to 5 that the PLA composite prepared from the PA copolymer in Example 1 has the optimal effect.

The above examples are used only to describe the technical solutions of the present disclosure and are not intended to limit the present disclosure. Although the present disclosure is described in detail with reference to the above examples, those of ordinary skill in the art should understand that they can still modify the technical solutions described in the above examples, or make equivalent substitutions to some technical features therein. These modifications or substitutions do not make the essence of the corresponding technical solutions depart from the spirit and scope of the technical solutions of the examples of the present disclosure.

What is claimed is:

1. A preparation method of a branched polyamide (PA) copolymer with an ultra-high toughness comprising the following steps:

(1) dissolving a linear dibasic acid in a first solvent to obtain a linear dibasic acid solution, dissolving a first diamine in a second solvent to obtain a first diamine solution, and dissolving a second diamine in a third solvent to obtain a second diamine solution, wherein the first diamine comprises (i) a linear diamine selected from ethylenediamine (EDA), 1,3-propanediamine, 1,4-diaminobutane, 1,5-pentanediamine, 1,6-hexanediamine, 2,2,4-trimethyl-1,6-hexanediamine, 2,4,4-trimethyl-1,6-hexanediamine, cis-1,4-cyclohexanediamine, trans-1,4-cyclohexanediamine, 1,8-octanediamine, 1,9-nonanediamine, 1,10-decanediamine, dodecanediamine, tridecanediamine, tetradecanediamine, cyclohexanediamine, methylcyclohexanediamine, p-phenylenediamine, m-phenylenediamine, and dimethyldiamine; or (ii) a mixture of the linear diamine and a diamine with an unreactive side group selected from 2-methylpentanediamine, 1,2-propanediamine, 1,3-diaminopentane, 2,2-dimethyl-1,3-propanediamine, and 4-fluoro-1,3-diaminobenzene, and the second diamine comprises a diamine with a reactive hydroxyl side group selected from 1,3-diamino-2-propanol and 2,4-diaminophenol;

(2) in separate preparations, adding the first diamine solution to a first portion of the linear dibasic acid solution, and mixing to obtain an amide salt solution B; and adding the second diamine solution to a second portion of the linear dibasic acid solution, mixing, and collecting a precipitate to obtain a solid amide salt C; and (3) adding the amide salt solution B and the solid amide salt C to a reactor, adding a catalyst, and after removing solvent and water by heating, conducting a melt polycondensation by heating to 150° C. to 170° C. to allow prepolymerization and then heating to 200° C. to 280° C. under vacuum to effect amide formation between amino and carboxyl groups and an esterification reaction between hydroxyl side groups of the second diamine and carboxyl groups to obtain the branched PA copolymer with the ultra-high toughness.

2. The preparation method of the branched PA copolymer with the ultra-high toughness according to claim 1, wherein in step (2), a pH of the amide salt solution B is adjusted to 6.5 to 7.5, and then the amide salt solution B is heated for a solvent evaporation and a concentration to obtain the amide salt solution B with a solute mass fraction of 60% to 80%.

3. The preparation method of the branched PA copolymer with the ultra-high toughness according to claim 1, wherein in step (2), the linear dibasic acid solution and the first diamine solution are mixed in a molar ratio of 0.98:1 to 1.02:1 during a preparation of the amide salt solution B, and the linear dibasic acid solution and the second diamine solution are mixed in a molar ratio of 0.98:1 to 1.02:1 during a preparation of the amide salt C.

4. A branched PA copolymer with an ultra-high toughness prepared by the preparation method according to claim 1, wherein the branched PA copolymer with an ultra-high toughness comprises a branched part and an unbranched part, and there are ester bonds in the branched part resulting from esterification between hydroxyl side groups of the second diamine and carboxyl groups.

5. The branched PA copolymer with the ultra-high toughness according to claim 4, wherein in a process of preparing the branched PA copolymer with the ultra-high toughness, in step (2), a pH of the amide salt solution B is adjusted to 6.5 to 7.5, and then the amide salt solution B is heated for a solvent evaporation and a concentration to obtain the amide salt solution B with a solute mass fraction of 60% to 80%.

6. The branched PA copolymer with the ultra-high toughness according to claim 4, wherein in a process of preparing the branched PA copolymer with the ultra-high toughness, in step (2), the linear dibasic acid solution and the first diamine solution are mixed in a molar ratio of 0.98:1 to 1.02:1 during a preparation of the amide salt solution, B and the linear dibasic acid solution and the second diamine solution are mixed in a molar ratio of 0.98:1 to 1.02:1 during a preparation of the amide salt C.

7. The branched PA copolymer with the ultra-high toughness according to claim 4, wherein in step (3) of the preparation method, a mass fraction of the amide salt solution B is 89% to 97%, a mass fraction of the solid amide salt C is 2% to 10%, and a mass fraction of the catalyst is 1% to 2%.

8. A bio-based nylon composite prepared from the following raw materials in parts by weight: 1 to 100 parts of nylon 6, 50 to 100 parts of the branched PA copolymer with the ultra-high toughness prepared by the preparation method according to claim 1, and 0 to 5 parts of an antioxidant.

9. A preparation method of the bio-based nylon composite according to claim 8, comprising the following steps:

(1) pretreating each of the nylon 6 and the branched PA copolymer with the ultra-high toughness in a vacuum oven at 40° C. to 120° C. for 4 h to 12 h to obtain pretreated materials; and (2) adding the pretreated materials to an internal mixer, and blending for 3 min to 20 min at a temperature of 180° C. to 260° C. and a rotational speed of 40 r/min to 300 r/min to obtain the bio-based nylon composite.

10. The bio-based nylon composite according to claim 8, wherein in a process of preparing the branched PA copolymer with the ultra-high toughness, in step (2), a pH of the amide salt solution is adjusted to 6.5 to 7.5, and then the amide salt solution is heated for a solvent evaporation and a concentration to obtain the amide salt solution with a solute mass fraction of 60% to 80%.

11. The bio-based nylon composite according to claim 8, wherein in a process of preparing the branched PA copolymer with the ultra-high toughness, in step (2), the linear dibasic acid solution and the first diamine solution are mixed in a molar ratio of 0.98:1 to 1.02:1 during a preparation of the amide salt solution, and the linear dibasic acid solution and the second diamine solution are mixed in a molar ratio of 0.98:1 to 1.02:1 during a preparation of the amide salt.

12. A PA fiber prepared from the following raw materials in parts by weight through a melt spinning: 1 to 1,000 parts of the branched PA copolymer with the ultra-high toughness prepared by the preparation method according to claim 1 and 0 to 5 parts of an antioxidant.

13. A preparation method of the PA fiber according to claim 12, comprising the following steps:

(1) pretreating the branched PA copolymer with the ultra-high toughness at 40° C. to 100° C. for 4 h to 12 h to obtain a pretreated PA copolymer; and (2) mixing the pretreated PA copolymer with the antioxidant, adding a resulting mixture to a melt spinning machine, preheating at 50° C. to 120° C., conducting a melt compression at 180° C. to 250° C., extruding, and rolling out at a speed of 1 m/min to 3,000 m/min to obtain the PA fiber.

14. The PA fiber according to claim 12, wherein in a process of preparing the branched PA copolymer with the ultra-high toughness, in step (2), a pH of the amide salt solution is adjusted to 6.5 to 7.5, and then the amide salt solution is heated for a solvent evaporation and a concentration to obtain the amide salt solution with a solute mass fraction of 60% to 80%.

15. The PA fiber according to claim 12, wherein in a process of preparing the branched PA copolymer with the ultra-high toughness, in step (2), the linear dibasic acid solution and the first diamine solution are mixed in a molar ratio of 0.98:1 to 1.02:1 during a preparation of the amide salt solution, and the linear dibasic acid solution and the second diamine solution are mixed in a molar ratio of 0.98:1 to 1.02:1 during a preparation of the amide salt.

16. A high-strength and high-toughness polylactic acid (PLA) composite prepared from the following raw materials in parts by weight: 50 to 100 parts of PLA, 1 to 50 parts of the branched PA copolymer with the ultra-high toughness prepared by the preparation method according to claim 1, and 0 to 1 part of an antioxidant.

17. A preparation method of the high-strength and high-toughness PLA composite according to claim 16, comprising the following steps:

(1) pretreating each of the PLA and the branched PA copolymer with the ultra-high toughness in a vacuum oven at 40° C. to 120° C. for 4 h to 12 h to obtain pretreated materials; and (2) adding the pretreated materials to an internal mixer, and blending for 3 min to 20 min at a temperature of 160° C. to 240° C. and a rotational speed of 40 r/min to 300 r/min to obtain the high-strength and high-toughness PLA composite.

18. The high-strength and high-toughness PLA composite according to claim 16, wherein in a process of preparing the branched PA copolymer with the ultra-high toughness, in step (2), a pH of the amide salt solution is adjusted to 6.5 to 7.5, and then the amide salt solution is heated for a solvent evaporation and a concentration to obtain the amide salt solution with a solute mass fraction of 60% to 80%.

19. The high-strength and high-toughness PLA composite according to claim 16, wherein in a process of preparing the branched PA copolymer with the ultra-high toughness, in step (2), the linear dibasic acid solution and the first diamine solution are mixed in a molar ratio of 0.98:1 to 1.02:1 during a preparation of the amide salt solution, and the linear dibasic acid solution and the second diamine solution are mixed in a molar ratio of 0.98:1 to 1.02:1 during a preparation of the amide salt.

* * * * *